US012587938B2

(12) United States Patent
Wang et al.

(10) Patent No.: US 12,587,938 B2
(45) Date of Patent: Mar. 24, 2026

(54) CELL HANDOVER METHOD AND APPARATUS, AND STORAGE MEDIUM

(71) Applicant: DATANG MOBILE COMMUNICATIONS EQUIPMENT CO.,LTD., Beijing (CN)

(72) Inventors: Ruiwei Wang, Beijing (CN); Aijuan Liu, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 320 days.

(21) Appl. No.: 18/261,662

(22) PCT Filed: Jan. 10, 2022

(86) PCT No.: PCT/CN2022/071025
§ 371 (c)(1),
(2) Date: Jul. 14, 2023

(87) PCT Pub. No.: WO2022/152084
PCT Pub. Date: Jul. 21, 2022

(65) Prior Publication Data
US 2024/0080720 A1      Mar. 7, 2024

(30) Foreign Application Priority Data

Jan. 14, 2021     (CN) ......................... 202110049837.5

(51) Int. Cl.
*H04W 36/36*          (2009.01)
*H04W 36/00*          (2009.01)
(Continued)

(52) U.S. Cl.
CPC ..... *H04W 36/362* (2023.05); *H04W 36/0064* (2023.05); *H04W 36/08* (2013.01); *H04W 36/305* (2018.08)

(58) Field of Classification Search
CPC ............. H04W 36/362; H04W 36/305; H04W 36/0064; H04W 36/08
See application file for complete search history.

(56) References Cited

U.S. PATENT DOCUMENTS 9,467,915 B2 * 10/2016 Park ...................... H04W 24/04
2013/0178204 A1    7/2013 Zhang et al.
(Continued)

FOREIGN PATENT DOCUMENTS

CN        107666672 A     2/2018
CN        110915259 A     3/2020
(Continued)

OTHER PUBLICATIONS

ISA State Intellectual Property Office of the People's Republic of China, International Search Report Issued in Application No. PCT/CN2022/071025, Mar. 30, 2022, WIPO, 18 pages.
(Continued)

*Primary Examiner* — Kenny S Lin
(74) *Attorney, Agent, or Firm* — KILPATRICK TOWNSEND & STOCKTON LLP

(57) ABSTRACT

The present application provides a cell handover method which includes: receiving a first message transmitted by a first cell, where the first message indicates the terminal to perform a cell handover with an enhanced handover characteristic or a cell handover with a non-enhanced handover characteristic, and the cell handover with the enhanced handover characteristic includes a conditional handover (CHO) or a dual active protocol stack (DAPS) handover; performing a handover from the first cell to a second cell according to the first message; receiving a second message transmitted by the second cell, where the second message indicates the terminal to perform the cell handover with the enhanced handover characteristic; and performing a handover from the second cell to a third cell according to the
(Continued)

second message, and generating an RLF report and recording timing duration in the RLF report if an RLF occurs in the second cell.

20 Claims, 8 Drawing Sheets

(51) Int. Cl.
*H04W 36/08* (2009.01)
*H04W 36/30* (2009.01)

(56) References Cited

U.S. PATENT DOCUMENTS

| | | | | |
|---|---|---|---|---|
| 2020/0351731 | A1* | 11/2020 | Kim | H04W 36/0094 |
| 2022/0014987 | A1* | 1/2022 | Fujishiro | H04W 36/0079 |
| 2022/0070740 | A1* | 3/2022 | Futaki | H04W 36/0077 |
| 2022/0124519 | A1* | 4/2022 | Xu | H04W 36/362 |
| 2022/0338087 | A1* | 10/2022 | Uchino | H04W 76/19 |
| 2022/0386197 | A1* | 12/2022 | Hwang | H04W 36/362 |
| 2024/0015610 | A1* | 1/2024 | Fang | H04W 36/362 |
| 2024/0049098 | A1* | 2/2024 | Wang | H04W 36/0083 |
| 2024/0073755 | A1* | 2/2024 | Yan | H04W 36/0069 |

FOREIGN PATENT DOCUMENTS

| | | |
|---|---|---|
| CN | 112042224 A | 12/2020 |
| CN | 113411847 A | 9/2021 |

OTHER PUBLICATIONS

Nokia et al.,"On RLF reporting for CHO and DAPS", 3GPP TSG-RAN WG2 Meeting #108, Reno, USA, 18-22 of Nov. 2019, total 3 pages, R2-1915497.

State Intellectual Property Office of the People's Republic of China, First Office Action issued in Application No. 202110049837.5, Jul. 8, 2023, 12 pages.

CATT,"Discussion on CHO and DAPS Mobility Enhancement", 3GPP TSG-RAN WG2 Meeting #112 electronic, Online, Nov. 2-13, 2020, total 6 pages, R2-2008844.

Lenovo et al.,"RLF report for DAPS handover", 3GPP TSG-RAN WG3 Meeting #109e, Online, Aug. 17-28, 2020, total 2 pages, R3-204919.

Ericsson,"[Offline-803][NR/R17 SON/MDT] Information needed in UE report for CHO cases (Ericsson)", 3GPP TSG-RAN WG2 #112-e, Electronic meeting, Nov. 2-Nov. 13, 2020, total 13 pages, R2-201xxxx.

* cited by examiner

CELL HANDOVER METHOD AND APPARATUS, AND STORAGE MEDIUM

The present application is a National Stage of the International Application No. PCT/CN2022/071025, filed on Jan. 10, 2022, which claims priority to Chinese Patent Application No. 202110049837.5, filed to China National Intellectual Property Administration on Jan. 14, 2021 and titled "CELL HANDOVER METHOD AND APPARATUS, AND STORAGE MEDIUM", both of the aforementioned applications are hereby incorporated by reference in their entireties.

FIELD

The present application relates to the field of communications, and more particularly, to a cell handover method and apparatus, and a storage medium.

BACKGROUND

In a communication system, a terminal performs a handover from one cell to another during mobility to ensure communication quality. In existing handover of cells, if there is a handover failure or radio link failure (RLF), an interaction of air interface messages occurs between the terminal and the cell, and an interaction of XN interface messages occurs between cells, to enable network device to trigger the adjustment of the handover parameter.

At present, the third generation partnership project (3GPP) has introduced an enhanced handover characteristic of a cell handover, including the introduction of a conditional handover in a cell handover and a dual active protocol stack handover in a cell handover. However, for the cell handover with the enhanced handover characteristic, the air interface message and/or the XN interface message also need to be enhanced.

SUMMARY

The present application provides a cell handover method and apparatus, and a storage medium for solving the problem of enhancing the air interface message and/or the XN interface message during the cell handover of the with an enhanced handover characteristic.

In one embodiment of the present application provides a cell handover method, applied to a terminal, including:

receiving a first message transmitted by a first cell, where the first message indicates the terminal to perform a cell handover with an enhanced handover characteristic or a cell handover with a non-enhanced handover characteristic, and the cell handover with the enhanced handover characteristic includes a conditional handover CHO or a dual active protocol stack DAPS handover;

performing a handover from the first cell to a second cell according to the first message;

receiving a second message transmitted by the second cell, where the second message indicates the terminal to perform the cell handover with the enhanced handover characteristic; and performing a handover from the second cell to a third cell according to the second message, and generating an RLF report and recording timing duration in the RLF report if an RLF occurs in the second cell, where the timing duration is elapsed time from reception of the first message by the terminal to occurrence of the RLF in the second cell.

In one embodiment, the method further includes:

restarting a reporting timer of the terminal when the terminal receives the first message;

storing a current value of the reporting timer as first duration and restarting the reporting timer again when the terminal receives the second message;

the generating the RLF report and recording the timing duration in the RLF report if the RLF occurs in the second cell includes:

generating the RLF report if the RLF occurs in the second cell; and determining a current value of the reporting timer as second duration, and recording the first duration and the second duration in the RLF report.

In one embodiment, when the first message indicates the terminal to perform the cell handover with the non-enhanced handover characteristic, the method further includes:

restarting a reporting timer of the terminal when the terminal receives the first message;

the generating the RLF report and recording the timing duration in the RLF report if the RLF occurs in the second cell includes:

generating the RLF report and recording a current value of the reporting timer as the timing duration in the RLF report if the RLF occurs in the second cell.

In one embodiment, the method further includes:

restarting the reporting timer again after the terminal completes the handover from the second cell to the third cell according to the second message.

In one embodiment of the present application provides a cell handover method, applied to a network device, including:

transmitting a second message to a terminal through a second cell, where the second message indicates the terminal to perform a cell handover with an enhanced handover characteristic, and the cell handover with the enhanced handover characteristic includes a CHO or a DAPS handover;

if it is detected that the terminal has recorded an RLF report during a process of performing a handover from the second cell to a third cell according to the second message, generating a failure indication message, where the failure indication message is used for parameter optimization of the cell handover.

In one embodiment, the method further includes:

adding the RLF report in the failure indication message if the RLF report transmitted by the terminal is received.

In one embodiment, when the second message indicates the terminal to perform the CHO, and the third cell belongs to one of multiple candidate cells in the CHO, the method further includes:

if a connection failure is detected during the process of the terminal performing the handover from the second cell to the third cell according to the second message, and the terminal connects to a fourth cell after the connection failure, generating the failure indication message in the fourth cell, where the fourth cell is a further cell among the multiple candidate cells except for the third cell;

where the connection failure includes a handover failure of the terminal performing the handover from the second cell to the third cell, or occurrence of an RLF in the third cell after the terminal successfully performs the handover from the second cell to the third cell.

In one embodiment, the failure indication message includes one or more of the following: identification information of a candidate cell to which the terminal connects in the CHO, whether the terminal successfully connects to a candidate cell in the CHO, residence information of the terminal in a candidate cell after the terminal successfully connects to the candidate cell in the CHO, the RLF report, and identification information of the terminal;

where the identification information of the terminal includes: identification information of the terminal in the target cell to which the terminal successfully connects in the CHO, and/or identification information of the terminal in the source cell in the CHO.

In one embodiment, the method further includes:

generating a handover report message according to the failure indication message;

where the handover report message includes a failure reason, the failure reason includes one or more of the following: early handover, late handover, and a handover to a wrong cell, and the handover report message further includes one or more of the following: identification information of a candidate cell to which the terminal connects in the CHO, whether the terminal successfully connected to a candidate cell in the CHO, residence information of the terminal in a candidate cell after the terminal successful connects to the candidate cell in the CHO, and the RLF report.

In one embodiment, when the second message indicates the terminal to perform the DAPS handover, and the third cell is a target cell in the DAPS handover, the method further includes:

adding the RLF report in the failure indication message if the RLF report transmitted by the terminal is received; and transmitting the failure indication message to the second cell through the third cell if the RLF report indicates that an RLF occurs in the second cell during the DAPS handover.

In one embodiment, the method further includes:

generating a handover report message according to the failure indication message, where the handover report message includes identification information of the target cell in the DAPS handover.

In one embodiment of the present application provides a cell handover apparatus, applied to a terminal, including a memory, a transceiver, and a processor:

the memory is configured to store a computer program;

the transceiver is configured to receive and transmit data under the control of the processor;

the processor is configured to read the computer program in the memory and perform the following operations:

receiving a first message transmitted by a first cell, where the first message indicates the terminal to perform a cell handover with an enhanced handover characteristic or a cell handover with a non-enhanced handover characteristic, and the cell handover with the enhanced handover characteristic includes a conditional handover CHO or a dual active protocol stack DAPS handover;

performing a handover from the first cell to a second cell according to the first message;

receiving a second message transmitted by the second cell, where the second message indicates the terminal to perform the cell handover with the enhanced handover characteristic; and performing a handover from the second cell to a third cell according to the second message, and generating an RLF report and recording timing duration in the RLF report if an RLF occurs in the second cell, where the timing duration is elapsed time from reception of the first message by the terminal to occurrence of the RLF in the second cell.

In one embodiment, the processor is further used to perform the following operations:

restarting a reporting timer of the terminal when the terminal receives the first message;

storing a current value of the reporting timer as first duration and restarting the reporting timer again when the terminal receives the second message;

the generating the RLF report and recording the timing duration in the RLF report if the RLF occurs in the second cell includes:

generating the RLF report if the RLF occurs in the second cell; and determining a current value of the reporting timer as second duration, and recording the first duration and the second duration in the RLF report.

In one embodiment, when the first message indicates the terminal to perform the cell handover with the non-enhanced handover characteristic, the processor is further used to perform the following operations:

restarting a reporting timer of the terminal when the terminal receives the first message;

the generating the RLF report and recording the timing duration in the RLF report if the RLF occurs in the second cell includes:

generating the RLF report and recording a current value of the reporting timer as the timing duration in the RLF report if the RLF occurs in the second cell.

In one embodiment, the processor is further configured to perform the following operation:

restarting the reporting timer again after the terminal completes the handover from the second cell to the third cell according to the second message.

In one embodiment of the present application provides a cell handover apparatus, applied to a network device, including a memory, a transceiver, and a processor:

the memory is configured to store a computer program;

the transceiver is configured to receive and transmit data under the control of the processor;

the processor is configured to read the computer program in the memory and perform the following operations:

transmitting a second message to a terminal through a second cell, where the second message indicates the terminal to perform a cell handover with an enhanced handover characteristic, and the cell handover with the enhanced handover characteristic includes a CHO or a DAPS handover; and if it is detected that the terminal has recorded an RLF report during a process of performing a handover from the second cell to a third cell according to the second message, generating a failure indication message, where the failure indication message is used for parameter optimization of the cell handover.

In one embodiment, the processor is further configured to perform the following operation:

adding the RLF report in the failure indication message if the RLF report transmitted by the terminal is received.

In one embodiment, when the second message indicates the terminal to perform the CHO, and the third cell belongs to one of multiple candidate cells in the CHO, and the processor is further configured to perform the following operation:

if a connection failure is detected during the process of the terminal performing the handover from the second cell to a third cell according to the second message, and the terminal connects to a fourth cell after the connection failure, generating the failure indication message in the fourth cell, where the fourth cell is a further cell among the multiple candidate cells except for the third cell;

where the connection failure includes a handover failure of the terminal performing the handover from the second cell to the third cell, or occurrence of an RLF in the third cell after the terminal successfully performs the handover from the second cell to the third cell.

In one embodiment, the failure indication message includes one or more of the following:

identification information of a candidate cell to which the terminal connects in CHO, whether the terminal successfully connects to a candidate cell in the CHO, residence information of the terminal in a candidate cell after the terminal successfully connects to the candidate cell in the CHO, the RLF report, and identification information of the terminal;

where the identification information of the terminal includes: identification information of the terminal in a target cell to which the terminal successfully connects in the CHO, and/or identification information of the terminal in a source cell in the CHO.

In one embodiment, the processor is further configured to perform the following operation:

generating a handover report message according to the failure indication message;

where the failure report message includes a failure reason, the failure reason includes one or more of the following: early handover, late handover, and a handover to a wrong cell, and the handover report message further includes one or more of the following: identification information of a candidate cell to which the terminal connects in the CHO, whether the terminal successfully connected to a candidate cell in the CHO, residence information of the terminal in a candidate cell after the terminal successful connects to the candidate cell in the CHO, and the RLF report.

In one embodiment, when the second message indicates the terminal to perform the DAPS handover, and the third cell is a target cell in the DAPS handover, the processor is further configured to perform the following operations:

adding the RLF report in the failure indication message if the RLF report transmitted by the terminal is received;

transmitting the failure indication message to the second cell through the third cell if the RLF report indicates that an RLF occurs in the second cell during the DAPS handover.

In one embodiment, the processor is further configured to perform the following operation:

generating a handover report message according to the failure indication message, where the handover report message includes identification information of the target cell in the DAPS handover.

In one embodiment of the present application provides a cell handover apparatus, applied to a terminal, including:

a first receiving device, configured to receive a first message transmitted by a first cell, where the first message indicates the terminal to perform a cell handover with an enhanced handover characteristic or a cell handover with a non-enhanced handover characteristic, and the cell handover with the enhanced handover characteristic includes a conditional handover CHO or a dual active protocol stack DAPS handover;

a first handover device, configured to perform a handover from the first cell to a second cell according to the first message;

a second receiving device, configured to receive a second message transmitted by the second cell, where the second message indicates the terminal to perform the cell handover with the enhanced handover characteristic;

a second handover device, configured to perform handover from the second cell to a third cell according to the second message; and an RLF report generation device, configured to generate an RLF report and recording timing duration in the RLF report if an RLF occurs in the second cell, where the timing duration is elapsed time from reception of the first message by the terminal to occurrence of the RLF in the second cell.

In one embodiment, the apparatus further includes:

a first restart device, configured to restart a reporting timer of the terminal when the terminal receives the first message;

a second restart device, configured to store a current value of the reporting timer as first duration and restart the reporting timer again when the terminal receives the second message;

the RLF report generation device is configured to:

generate the RLF report if the RLF occurs in the second cell; and determine a current value of the reporting timer as second duration, and recording the first duration and the second duration in the RLF report.

In one embodiment, when the first message indicates the terminal to perform the cell handover with the non-enhanced handover characteristic, the apparatus further includes:

a third restart device, configured to restart a reporting timer of the terminal when the terminal receives the first message;

the RLF report generation device is configured to:

generate the RLF report and record a current value of the reporting timer as the timing duration in the RLF report if the RLF occurs in the second cell.

In one embodiment, the apparatus further includes:

a fourth restart device, configured to restart the reporting timer again after the terminal completes the handover from the second cell to the third cell according to the second message.

In one embodiment of the present application provides a cell handover apparatus, applied to a network device, including:

a first transmitting device, configured to transmit a second message to a terminal through a second cell, where the second message indicates the terminal to perform a cell handover with an enhanced handover characteristic, and the cell handover with the enhanced handover characteristic includes a CHO or a DAPS handover;

a first generation device, configured to generate a failure indication message if it is detected that the terminal has recorded an RLF report during a process of performing a handover from the second cell to a third cell according to the second message, where the failure indication message is used for parameter optimization of the cell handover.

In one embodiment, the apparatus further includes:

a second addition device, configured to add the RLF report in the failure indication message if the RLF report transmitted by the terminal is received.

In one embodiment, when the second message indicates the terminal to perform the CHO, and the third cell belongs to one of multiple candidate cells in the CHO, and the apparatus further includes:

a second generation device, configured to generate the failure indication message in a fourth cell if a connection failure is detected during the process of the terminal performing handover from the second cell to the third cell according to the second message, and the terminal connects to the fourth cell after the connection failure, where the fourth cell is a further cell among the multiple candidate cells except for the third cell;

where the connection failure includes a handover failure of the terminal performing the handover from the second cell to the third cell, or occurrence of an RLF in the third cell after the terminal successfully performs the handover from the second cell to the third cell.

In one embodiment, the failure indication message includes one or more of the following: identification information of a candidate cell to which the terminal connects in the CHO, whether the terminal successfully connects to a candidate cell in the CHO, residence information of the terminal in a candidate cell after the terminal successfully connects to the candidate cell in the CHO, the RLF report, and identification information of the terminal;

where the identification information of the terminal includes: identification information of the terminal in the target cell to which the terminal successfully connects in the CHO, and/or identification information of the terminal in a source cell in the CHO.

In one embodiment, the apparatus further includes:

a third generation device, configured to generate a handover report message according to the failure indication message;

where the handover report message includes a failure reason, the failure reason includes one or more of the following: early handover, late handover, and a handover to a wrong cell, and the handover report message further includes one or more of the following:

identification information of a candidate cell to which the terminal connects in the CHO, whether the terminal successfully connected to a candidate cell in the CHO, residence information of the terminal in a candidate cell after the terminal successful connects to the candidate cell in the CHO, and the RLF report.

In one embodiment, when the second message indicates the terminal to perform the DAPS handover, and the third cell is a target cell in the DAPS handover, and the apparatus further includes:

a first addition device, configured to add the RLF report in the failure indication message if the RLF report transmitted by the terminal is received; and a second transmitting device, configured to transmit the failure indication message to the second cell through the third cell if the RLF report indicates that an RLF occurs in the second cell during the DAPS handover.

In one embodiment, the apparatus further includes:

a fourth generation device, configured to generate a handover report message according to the failure indication message, where the handover report message includes identification information of the target cell in the DAPS handover.

In one embodiment of the present application provides a processor-readable storage medium, the processor-readable storage medium stores a computer program used to enable a processor to execute the method according to the first or second aspect.

In one embodiment of the present application provides a computer program product containing instructions, when the instructions run on a computer, the method according to the embodiments.

In one embodiment of the present application provides a communication system, including a terminal as described in any one of the above and a network device as described in in any one of the above.

The present application provides a cell handover method and apparatus, and a storage medium, after a terminal performs a handover from a first cell to a second cell according to the received first message, and then during the process of performing a handover from the second cell to a third cell according to the received second message through the cell handover with an enhanced handover characteristic, an RLF report is generated if an RLF occurs in the second cell, and the timing duration in the RLF report is elapsed time from reception of the first message by the terminal to occurrence of the RLF in the second cell. Therefore, the RLF report in the cell handover with an enhanced handover characteristic is enhanced, that is, an air interface message in the cell handover with an enhanced handover characteristic is enhanced, to improve the effect of optimizing the handover parameter according to the air interface message.

It should be understood that the content described in the above summary section is not intended to limit the key or important features of the embodiments of the present application, nor is it intended to limit the scope of the present application. The other features of the present application will be easily understood through the following description.

BRIEF DESCRIPTION OF DRAWINGS

In order to provide a clearer explanation of the embodiments in the present application or prior art, a brief introduction will be given to the accompanying drawings required in the embodiments or prior art description. It is evident that the accompanying drawings in the following description are some embodiments of the present application.

DESCRIPTION OF EMBODIMENTS

Figure 1:
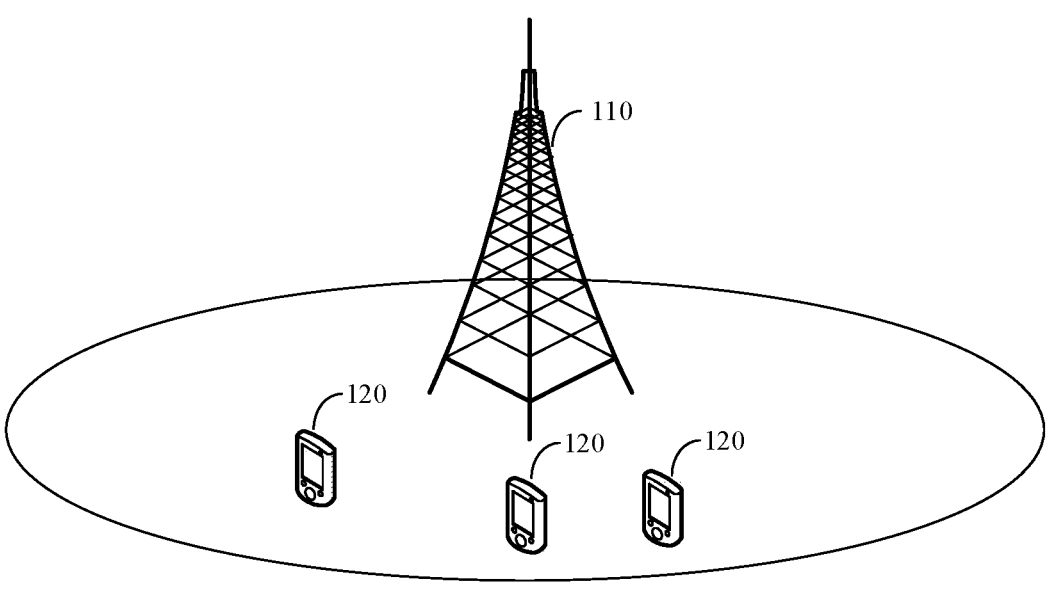
FIG. 1 is a schematic diagram of the application scenario provided by an embodiment of the present application.

The term "and/or" in the present application describes the association relationship of the associated objects, indicating that there can be three types of relationships, for example, A and/or B, which can represent the following three types of relationships: the existence of A alone, the existence of A and B simultaneously, and the existence of B alone. The character "I" generally indicates that the associated objects are in an "or" relationship.

The term "multiple" in an embodiment of the present application refers to two or more, and other quantifiers are similar to it.

The embodiments of the present application will be described in the following clear and complete description in conjunction with the accompanying drawings of the present application. The described embodiments are only some of the embodiments of the present application and not all of them.

The embodiments of the present application can be applied to various systems, especially 5G systems. For example, an applicable system can be: a global system of mobile communication (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a long term evolution advanced (LTE-A) system, a universal mobile telecommunication system (UMTS), a worldwide interoperability for microwave access (WiMAX) system, a 5G New Radio (NR) system, etc. These various systems all include terminals and network devices. The system may also include a core network portion, such as an evolved packet system (EPS), a 5G system (5GS), etc.

The terminal involved in the embodiments of the present application may be a device that provides voice and/or data connectivity to a user, a handheld device with a wireless connection function, or other processing devices connected to a wireless modem. The name of the terminal may also vary in different systems. For example, in a 5G system, the terminal may be called user equipment (UE). A wireless terminal may communicate with one or more core networks (CN) via a radio access network (RAN). The wireless terminal may be a mobile terminal, such as a cell phone (or "cellular" phone) and a computer with a mobile terminal, for example, a portable, pocket-sized, handheld, computer built-in, or vehicle-mounted mobile device, that exchanges language and/or data with the radio access network. For example, a personal communication service (PCS) terminal, a cordless phone, a session initiated protocol (SIP) phone, a wireless local loop (WLL) station, a (Personal Digital Assistant, PDA) or other devices. The wireless terminal can also be called a system, a subscriber unit, a subscriber station, a mobile station, a mobile, a remote station, an access point, a remote terminal, an access terminal, a user terminal, a user agent, and a user device, which are not limited in the embodiments of the present application.

The network device involved in the embodiments of the present application may be a base station, which may include a plurality of cells providing services to the terminal. Depending on the specific application, the base station can also be called an access point, or a device in the access network that communicates with the wireless terminal through one or more sectors on an air interface, or other names. The network device may be used to interchange a received air frame with an Internet protocol (IP) packet, and may act as a router between the wireless terminal and the rest of the access network, the rest of the access network may include an Internet protocol (IP) communication network. The network device may also coordinate the management of attributes of the air interface. For example, the network device involved in the embodiments of the present application may be a base station (Base Transceiver Station, BTS) in a global system for mobile communications system (GSM) or code division multiple access (CDMA), or a network device (NodeB) in a Wide-band Code Division Multiple Access (WCDMA), or an evolutional network device (evolutional Node B, eNB or e-NodeB) in a long term evolution (LTE) system, or a 5G base station (gNB) in a 5G network architecture (next generation system), or a home evolved base station (Home evolved Node B, HeNB), or a relay node, a home base station (femto), a pico base station (pico), etc., which are not limited in the embodiments of the present application. In some network structures, the network device may include a centralized unit (CU) node and a distributed unit (DU) node, and the centralized unit and the distributed unit may also be geographically separated.

The network device and the terminal can use one or more antennas respectively for multi input multi output (MIMO) transmission, and the MIMO transmission can be single user MIMO (SU-MIMO) or multiple user MIMO (MU-MIMO). According to the shape and the number of the antenna combinations, the MIMO transmission can be 2D-MIMO, 3D-MIMO, FD-MIMO or massive-MIMO, or can be diversity transmission, pre-coded transmission or beamforming transmission, etc.

FIG. 1 is a schematic diagram of the application scenario provided by an embodiment of the present application. As shown in FIG. 1, the present embodiment provides a communication system 100, which includes a network device 110 and multiple terminals 120. Three terminals 120 are used as examples in FIG. 1. Terminal 120 is subjected to a cell handover as the user's location changes, perform a handover from a currently connected cell to another cell with better signal quality to ensure the signal quality of terminal 120.

During the process of the cell handover, if the connection between the terminal and the cell fails, the terminal and the network device can perform mobility robustness optimization (MRO) to assist the network device in optimizing the handover parameter. In the MRO, if the terminal fails to perform the handover from the source cell to the target cell, or if there is a radio link failure (RLF) in the source cell when the terminal is connected to the source cell, or if there is RLF in the target cell when the terminal is connected to the target cell, the terminal measures the cell configured for measurement and record the measurement result, as well as record relevant information such as a random access, a handover, and a re-establishment. After a handover failure or an RLF, the terminal reconnects to the network through a radio resource control (RRC) reestablishment or establishment, and notifies the network device that it has recorded messages related to the handover failure or the RLF. The network device obtains messages related to the handover failure or the RLF from the terminal on needs, and further generates a failure indication message, as well as generates a handover report message to optimize the handover parameter according to the failure indication message and/or the handover report message.

The message recorded on the terminal side and related to the handover failure or the RLF can be referred to as an RLF report.

The connection or disconnection between the terminal and the cell refers to the connection or disconnection between the terminal and the network device corresponding to the cell. Transmitting messages to the cell by the terminal refers to transmitting messages to the corresponding network device in the cell. Transmitting messages by the cell to the terminal refers to transmitting messages to the terminal by the network device corresponding to the cell. In other words, the network device transmits messages to the terminal through the cell.

In order to improve the success rate of the cell handover and/or reduce the adverse impact on terminal communication during a cell handover process, the 3rd Generation Partnership Project (3GPP) introduced the enhanced handover characteristic of the cell handover, including the introduction of a conditional handover and a dual active protocol stack handover in cell handover. In order to adapt to cell handover of enhanced handover characteristic, the MRO process also needs to be enhanced accordingly. An air interface message and/or XN interface message in the MRO also need to be enhanced. The air interface message in the MRO is an RLF report, and the XN interface message is a failure indication message, a handover report message.

For the convenience of understanding the embodiments of the present application, the following is a brief description of the RLF report, a traditional cell handover (i.e., cell handover with a non-enhanced handover characteristic), a CHO, a DAPS handover, a failure indication message, and a handover report message.

(1) RLF Report

The RLF report mainly cover two scenarios: a handover failure and an RLF, with one RLF report typically recording only one scenario. Usually, the RLF report includes content such as the measurement result of the terminal to a previous cell, the measurement result of an adjacent cell after the terminal confirms a handover failure or an RLF, the location information of the terminal, identification information of a terminal-failed cell, identification information of a terminal-re-established cell, timing duration (also known as a reporting timer of the terminal), and the reason for the connection failure. When the terminal fails to perform the handover, the terminal-failed cell is usually referred as a source cell, and when the cell connected to the terminal occurs the RLF, the cell that occurs the RLF is referred as the terminal-failed cell. The terminal-reestablished cell is the cell to which the terminal connects through the RRC connection reestablishment or establishment after a handover failure or an RLF occurs in the cell connected to the terminal. The identification information of a cell, for example, is represented by the Cell Global Identity (CGI) or the Physical Cell Identity (PCI) combined with a frequency point. The timing duration is obtained through the timing process of the reporting timer of the terminal. The terminal restarts the reporting timer every time it receives a handover instruction.

(2) Traditional Cell Handover

Figure 2:
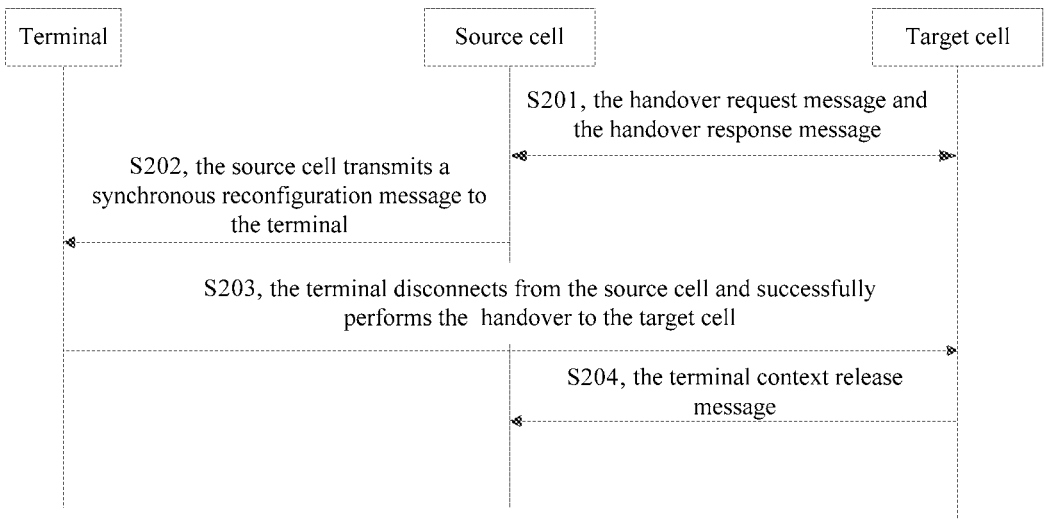
FIG. 2 is an example illustration of a successful handover in a traditional cell handover process.

FIG. 2 is an example illustration of a successful handover in a traditional cell handover process, which is a schematic diagram of the cell handover with a non-enhanced handover characteristic. As shown in FIG. 2, the traditional cell handover process includes:

S201, transceiving handover request messages and handover response messages between the source cell and the target cell. Among others, the source cell transmits the handover request message to the target cell, and the target cell transmits the handover response message to the source cell; S202, the source cell transmits a synchronous reconfiguration message to the terminal to notify the terminal to perform the handover to the target cell; S203, the terminal disconnects from the source cell and successfully performs the handover to the target cell; and S204, the target cell transmits a terminal context release message to the source cell to instruct the source cell to release the terminal context.

In the traditional cell handover process, if the terminal fails to perform the handover from the source cell to the target cell, or if an RLF occurs in the target cell after the terminal successfully performs the handover from the source cell to the target cell, the terminal generates an RLF report and transmits an RRC connection reestablishment or establishment request to a further cell. After the terminal successfully establishes an RCC connection with the further cell, the network device knows through the further cell that there is an RLF report recorded on the terminal, which can further generate a failure indication message and a handover report message.

As an example, the failure indication message in MRO is as follows (the left side of the table below shows the message content, and the right side explains the message content):

| MESSAGE CONTENT | DESCRIPTION |
|---|---|
| Optional branches | Triggered by an RRC connection reestablishment request or an RRC connection establishment request of the terminal |
| 1. RRC connection reestablishment | RRC connection reestablishment branch |
| 1.1. information carried in the RRC connection reestablishment request message | |
| 1.2. RLF report of the terminal | Optional content, if the network device receives the RLF report, the RLF report is carried in a failure indication message |
| 2. RRC establishment | RRC connection establishment branch |
| 2.1. RLF report of the terminal | Optional content, if the network device receives the RLF report, the RLF report is carried in a failure indication message |

As an example, the handover report message in the MRO is as follows (the left side of the table below shows the message content, and the right side explains the message content):

| MESSAGE CONTENT | DESCRIPTION |
|---|---|
| Types of the handover reports | The analyzed failure reason for a failed cell, such as early handover, late handover, handover to a wrong cell, etc. |
| Source cell of the handover | CGI of the source cell |
| Target cell of the handover | CGI of the target cell |
| RRC reestablishment cell | CGI of the cell connected through the RRC connection reestablishment or establishment by the terminal |
| RLF report of the terminal | Optional content, if there is an RLF report carried in the failure indication message, the RLF report is also carried in handover report massage. |

(3) CHO

The overall idea of the CHO is that network device transmits synchronous reconfiguration message to the terminal in advance through the source cell. The synchronous reconfiguration message includes one or more candidate cells. After receiving the synchronous reconfiguration message, the terminal selects the target cell from the candidate cells according to its own monitored signal. In the traditional cell handover, the network device specify the target cell through the source cell, and compared to determining the target cell by network device, determining the target cell by the terminal itself, on the one hand, it can more accurately consider the actual situation of the terminal, and on the other hand, it can solve the problem of poor handover performance caused by the inability of the terminal to receive or timely receive the synchronous reconfiguration message due to the high-speed movement in traditional cell handover.

Figure 3:
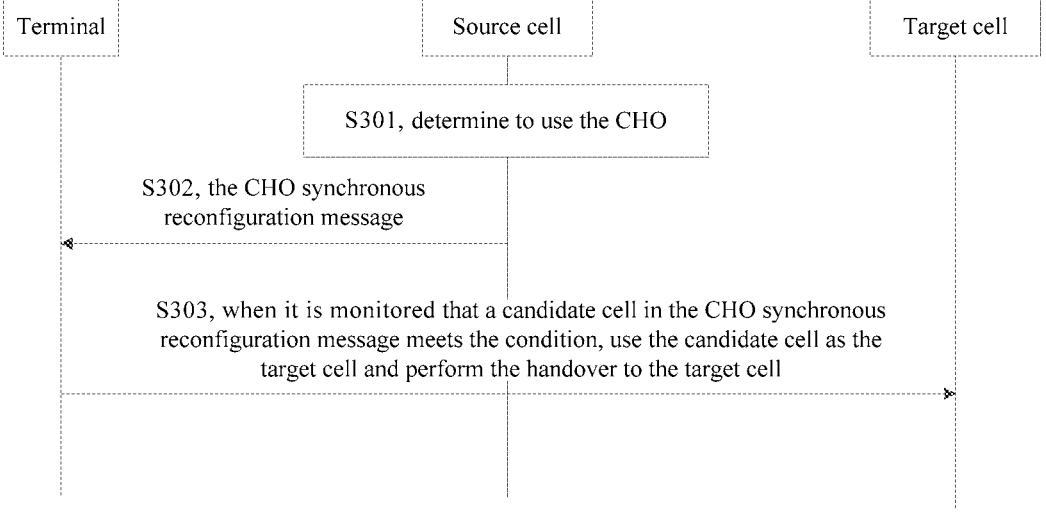
FIG. 3 is an example illustration of a successful handover during a CHO process.

FIG. 3 is an example illustration of a successful handover during the CHO process. As shown in FIG. 3, the CHO process includes:

S301, the source cell determines to use the CHO; S302, the source cell transmits the CHO synchronous reconfiguration message to the terminal to indicate the terminal to perform the CHO; and S303, when the terminal monitors that a candidate cell in the CHO synchronous reconfiguration message meets the condition, using the candidate cell as the target cell and performing the handover to the target cell.

It can be seen that during the CHO process, if the terminal fails to perform the handover from the source cell to the target cell, or if an RLF occurs in the target cell after the terminal successfully performs the handover from the source cell to the target cell, the terminal can also choose a further candidate cell as the target cell without the need for the RRC connection reestablishment or establishment. Therefore, the traditional MRO process is not triggered, but the connection failure does occur when performing the handover to the previous candidate cell, however, network device is unable to generate corresponding failure indication message and handover report message.

(4) DAPS Handover

Figure 4:
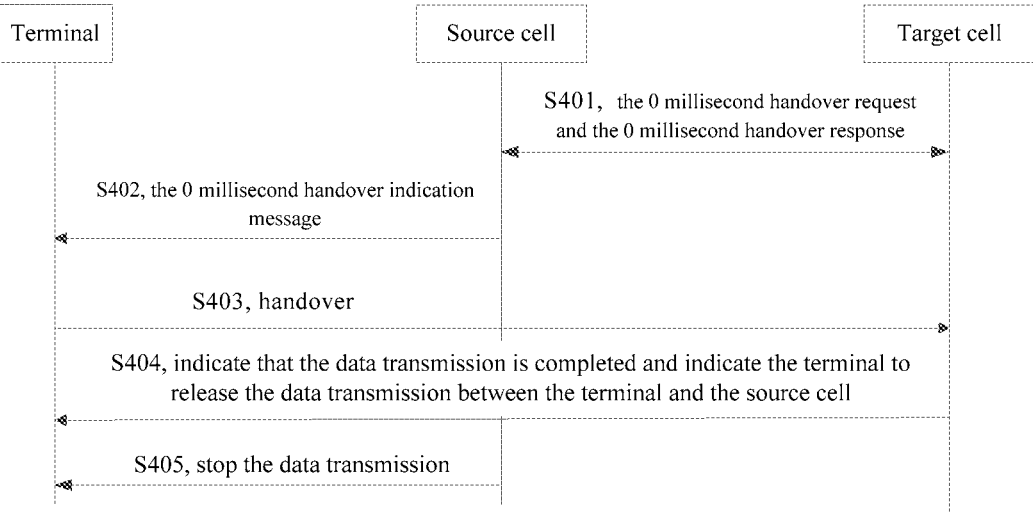
FIG. 4 is an example illustration of a successful DAPS handover.

Unlike the traditional handover, during the DAPS handover process, the data transmission link between the terminal and the source cell is not disconnected. The data transmission link between the terminal and the source cell disconnects only after the terminal successfully connects to the target cell. FIG. 4 is an example illustration of a successful DAPS handover, including:

S401, transceiving a 0 millisecond handover requests and a 0 millisecond handover responses between the source cell and the target cell, where the 0 millisecond represents the data transmission link between the source cell and the terminal is not disconnected; S402, the source cell transmits a 0 millisecond handover indication message to the terminal; S403, the terminal performs the handover to the target cell; S404, after the connection between the terminal and the target cell is successfully established, the target cell can notify the terminal that the data transmission is completed and indicate the terminal to release the data transmission between the terminal and the source cell; and S405, the terminal stops the data transmission with the source cell and releases the master cell group (or also referred as main cell group, MCG) configuration of the source cell.

Due to the fact that the terminal maintains data connectivity with both the source cell and the target cell during the DAPS handover process, connection failures during the DAPS handover process include failure to perform the handover from the source cell to the target cell, or an RLF occurs in the target cell after the terminal successfully performs the handover from the source cell to the target cell, or an RLF occurs in the source cell during the process that the terminal performs the handover from the source cell to the target cell or after the terminal successfully performs the handover from the source cell to the target cell.

After the terminal successfully performs the handover to the target cell and an RLF occurs in the source cell, there is no need for the terminal to reestablish or establish an RRC connection, thus the traditional MRO process is not triggered, in other words, it is unable to generate corresponding failure indication messages and handover report messages for such connection failures, resulting in the network device ignoring the optimization of the handover parameter in such connection failures. At the same time, the timing duration in the RLF report refers to elapsed time from reception of the DAPS handover command by the terminal to occurrence of the RLF in the source cell, which cannot reflect the duration of the terminal switching to the source cell and residing in the source cell.

To address the above issues, an embodiment of the present application provides a cell handover method and apparatus, a device, and a medium that enhance the air interface message (i.e. RLF report) between the terminal and the cell (or between the terminal and the network device), and/or XN interface message (i.e. the failure indication message, the handover report message) between different cells (or between different network device) in the cell handover with enhanced handover characteristic. Furthermore, the effect of the handover parameter optimization by the network device is improved.

Due to the similar principles of solving problems in the method and apparatus, the implementation of the apparatus and method can be referred to each other, and the repetition will not be repeated.

Figure 5:
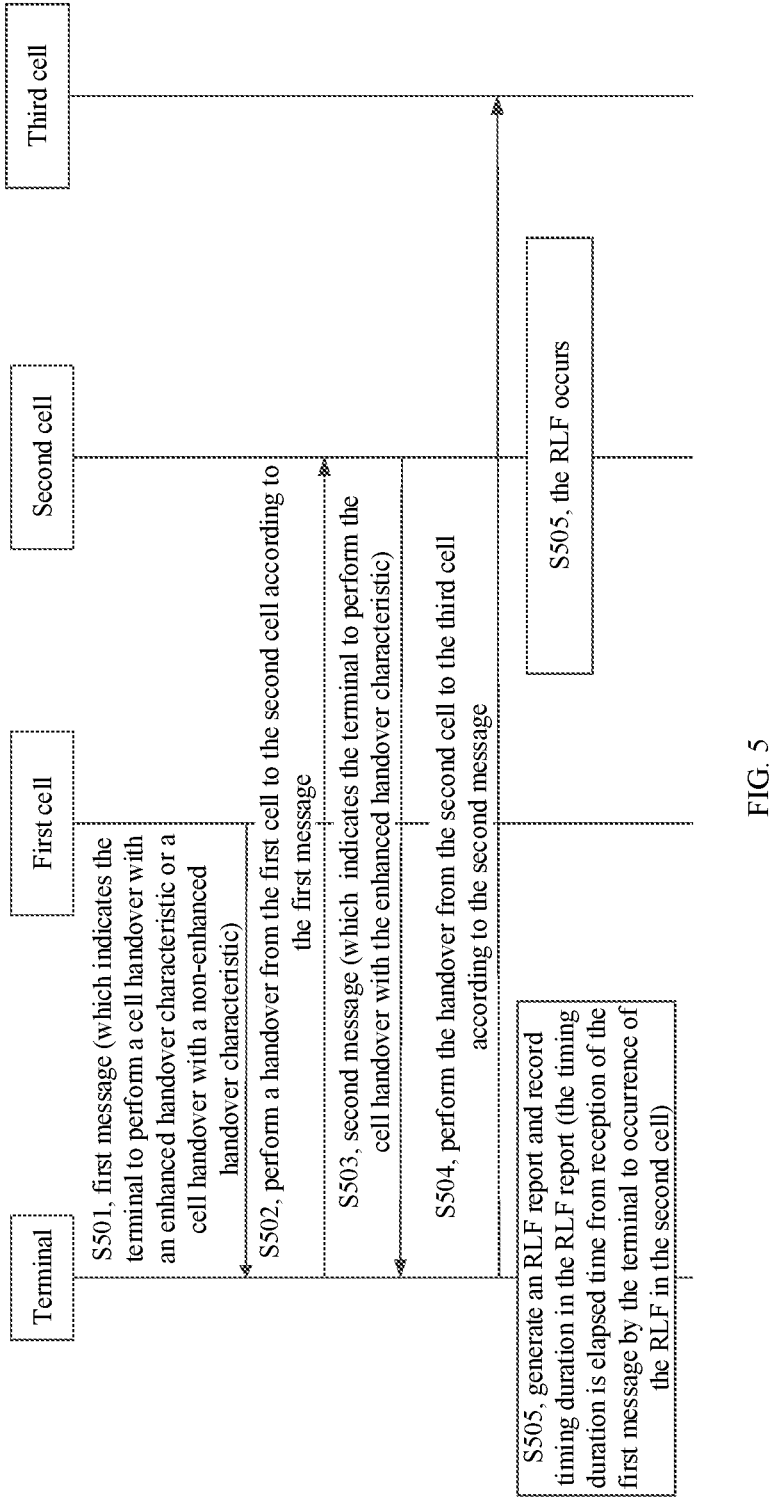
FIG. 5 is a schematic flowchart of a cell handover method provided by an embodiment of the present application.

FIG. 5 is a schematic flowchart of a cell handover method provided in an embodiment of the present application. As shown in FIG. 5, the method of this embodiment may include the following steps.

S501, the network device transmits a first message to the terminal through a first cell, where the first message indicates the terminal to perform a cell handover with an enhanced handover characteristic or a cell handover with a non-enhanced handover characteristic.

The cell handover with the enhanced handover characteristic includes a CHO or a DAPS handover.

The first cell is the source cell where the terminal device is located.

In one embodiment, when the terminal is connected to the network device through the first cell, the network device transmits a first message to the terminal through the first cell to indicate the terminal to perform cell handover. For example, there is no limitation on the triggering condition for the network device to transmit the first message, that is, there is no limitation on the terminal to perform the cell handover when what conditions are met. This can be referred to the CHO handover, the DAPS handover, or other handover.

S502, the terminal performs a handover from the first cell to the second cell according to the first message.

The second cell is the target cell to which the terminal device performs the handover cell according to the first message.

In one embodiment, if the first message indicates the terminal to perform the cell handover with a non-enhanced handover characteristic or a DAPS handover, the first message may include identification information of the second cell. If the first message indicates the terminal to perform the CHO, the first message may include identification information of multiple candidate cells, and the second cell belongs to one of the multiple candidate cells in the first message.

In one embodiment, the terminal performs the cell handover with the enhanced handover characteristic or the cell handover with the non-enhanced handover characteristic according to the indication of the first message, to perform the handover from the first cell to the second cell.

S503, the network device transmits a second message to the terminal through a second cell after the terminal successfully connects to the second cell, where the second message indicates the terminal to perform the cell handover with the enhanced handover characteristic.

In one embodiment, after the terminal successfully connects to the second cell, there is a possibility that due to the poor signal quality between the terminal and the second cell, or the position of the terminal has changed and left the second cell, etc., the network device may transmit a second message to the terminal through the second cell to indicate the terminal to perform the cell handover with the enhanced handover characteristic, such as indicates the terminal to perform the CHO or indicates the terminal to perform the DAPS.

S504, the terminal performs the handover from the second cell to the third cell according to the second message.

If the second message indicates the terminal to perform the CHO, the second message may include the identification information of the multiple candidate cells, and the third cell belongs to one of the multiple candidate cells. If the second message indicates the terminal to perform the DAPS, the third message includes identification information of the third cell.

In one embodiment, the terminal performs a cell handover according to the first message and then performs another cell handover according to the second message. When performing a cell handover according to the second message, the cell handover with the enhanced handover characteristic is performed to perform the handover from the second cell to the third cell, where the second cell is the source cell in this cell handover, and the third cell is the target cell in this cell handover.

S505, the terminal generates an RLF report and records timing duration in the RLF report if an RLF occurs in the second cell, where the timing duration is elapsed time from reception of the first message by the terminal to occurrence of the RLF in the second cell.

In one embodiment, when the terminal performs the handover from the second cell to the third cell according to the second message, it is likely that the terminal has not yet disconnected from the second cell. If an RLF occurs in the second cell, the terminal receives a message that the RLF occurs in the second cell. When the terminal receives the message that the RLF occurs in the second cell, an RLF report is generated.

In an example, when the second message indicates the terminal to perform the DAPS handover, during the process of the terminal performing the handover from the second cell to the third cell through the DAPS handover, the terminal maintains communication connection with both the second cell and the third cell until the DAPS handover is completed, and then the communication connection between the terminal and the second cell disconnects. Therefore, during the process of maintaining communication connection between the terminal and both the second and third cells, if an RLF occurs in second cell, the terminal generates an RLF report accordingly.

In another example, when the second message indicates the terminal to perform the CHO, due to the network device transmits the second message to the terminal in advance through the second cell during the CHO handover, during the process of monitoring whether there is a suitable candidate cell as a target cell, the terminal maintains the communication connection with the second cell. If an RLF occurs in the second cell, the terminal generates an RLF report accordingly, as the terminal is still in the second cell at this time, only receives the handover command but did not meet the CHO performing condition, and is not actually perform handover to the third cell.

In one embodiment, when generating an RLF report, the terminal obtains elapsed time from the reception of the first message by the terminal to the occurrence of the RLF in the second cell, and records the duration as the timing duration in the RLF report.

Compared to the manner of restarting the reporting timer of the terminal every time a cell handover indication message is received, and recording a current value of the reporting timer as timing duration in the RLF report when an RLF occurs in the cell (in this manner, the timing duration in the RLF report is elapsed time from execution of the cell handover operation by the terminal to occurrence of the RLF in cell), this embodiment records elapsed time from the reception of the first message by the terminal to the occurrence of the RLF in the second cell, which better reflects the stability of the previous cell handover of the terminal, that is, the stability of the cell handover performed after receiving the first message, which allows the network device to more accurately analyze the cause of RLF in the second cell during the MRO process according to the timing duration included in the RLF.

In addition to the timing duration, for example, the RLF report can also record content such as the measurement result of the second cell, the identification information of the second cell, and the occurrence of RLF in the second cell. For details, please refer to the previous content related to RLF reports, which will not be repeated here.

In this embodiment, the terminal performs the handover from the first cell to the second cell, and then performs the handover from the second cell to the third cell through the cell handover with the enhanced handover characteristic. Considering that the terminal is likely to maintain communication connection with the second cell after receiving a handover instruction during the cell handover with the enhanced handover characteristic, if an RLF occurs in the second cell, the terminal generates an RLF report accordingly, recording the elapsed time from reception of the first message by the terminal to occurrence of the RLF in the second cell in the RLF report to improve the accuracy of the timing duration in the RLF report in this scenario and realize the enhancement of the RLF report.

In some embodiments, when the terminal receives the first message, the reporting timer of the terminal is restarted; when the terminal receives the second message, a current value of the reporting timer is stored as the first duration and the reporting timer is restarted again; if an RLF occurs in the second cell, the terminal generates an RLF report when an RLF occurs in the second cell and obtains a current value of the reporting timer, the current value of the reporting timer is determined as the second duration; the first duration and the second duration are recorded in the RLF report.

The first duration is the elapsed time from reception of the first message by the terminal to reception of the second message by the terminal, and the second duration is the elapsed time from reception of the second message by the terminal to the occurrence of the RLF in the second cell. Therefore, by restarting the reporting timer when the terminal receives an indication message for cell handover, recording a current value of the reporting timer before restarting, and recording multiple durations in the RLF report, the elapsed time from the reception of the first message by the terminal to the occurrence of the RLF in the second cell can be recorded in the RLF.

In some embodiments, in the case that the first message indicates the terminal to perform the cell handover with the non-enhanced handover characteristic, the reporting timer of the terminal is restarted upon the terminal receiving the first message. When the terminal receives the second message, the reporting timer of the terminal is not restarted due to the fact that the second message indicates the terminal to perform the cell handover with the enhanced handover characteristic. If an RLF occurs in the second cell, the terminal generates an RLF report and records a current value of the reporting timer as timing duration included in the RLF.

By restarting the reporting timer when the terminal receives the first message and not restarting the reporting timer when the terminal receives the second message, a current value of the reporting timer when an RLF occurs in the second cell is the elapsed time from the reception of the first message by the terminal to the occurrence of the RLF in the second cell, recording of the elapsed time from the reception of the first message by the terminal to the occurrence of the RLF in the second cell in the RLF report is realized.

Furthermore, restarting the reporting timer again after the terminal completes the handover from the second cell to the third cell according to the second message. Therefore, the reporting timer of the terminal is not restarted when the second message is received, and the reporting timer of the terminal is restarted after the cell handover according to the second message is completed, in order to avoid the inability to obtain the elapsed time from the reception of the first message by the terminal to the occurrence of the RLF in the second cell through the reporting timer due to the terminal restarting the reporting timer upon receiving the second message.

In an example, in the CHO, when the terminal disconnects from the second cell and performs the handover from the second cell to the third cell according to the second message, it can be considered that the terminal completes the handover from the second cell to the third cell according to the second message.

In another example, in DAPS, when the terminal successfully performs the handover from the second cell to the third cell according to the second message and disconnects from the second cell, it can be considered that the terminal completes the handover from the second cell to the third cell according to the second message.

Figure 6:
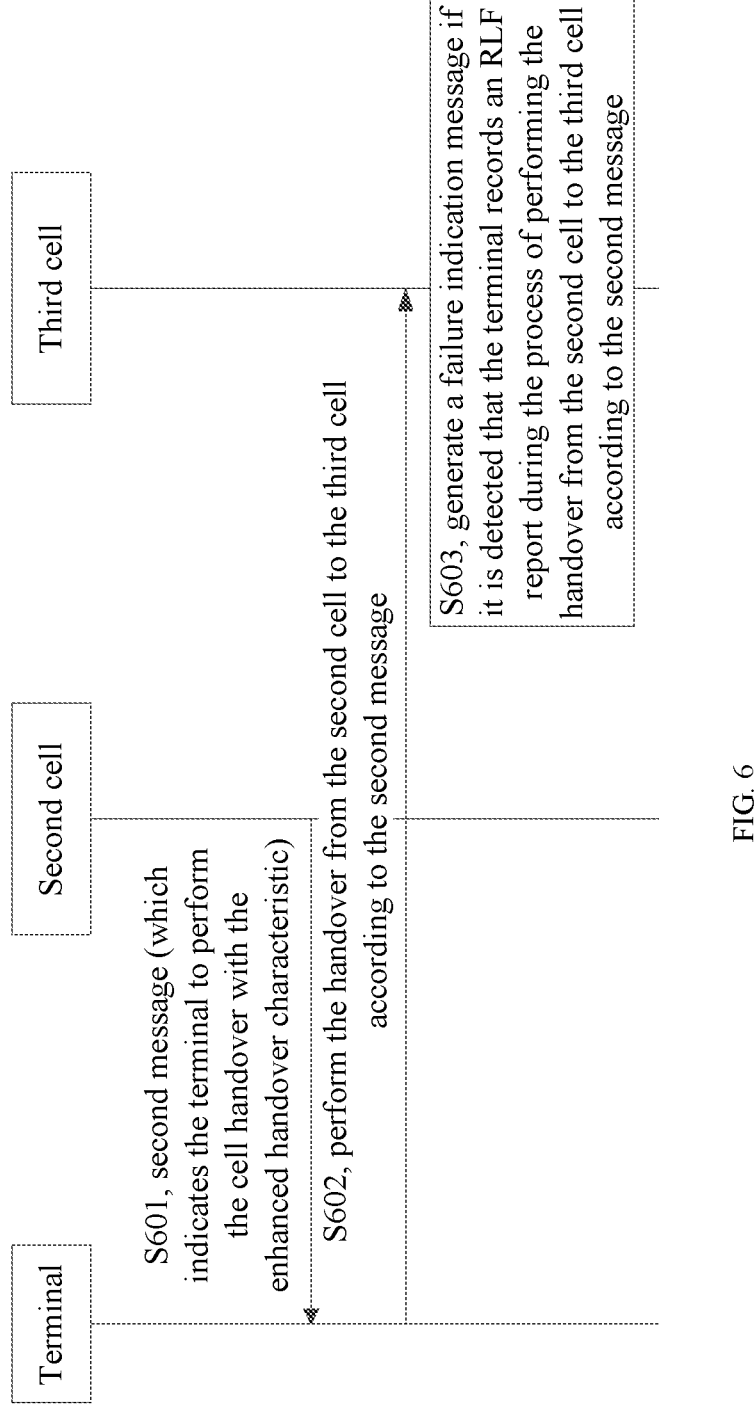
FIG. 6 is a schematic flowchart of a cell handover method provided by another embodiment of the present application.

FIG. 6 is a schematic flowchart of a cell handover method provided in another embodiment of the present application. As shown in FIG. 6, the method of this embodiment may include the following steps.

S601, the network device transmits a second message to the terminal, where the second message is used to indicate the terminal to perform a cell handover with an enhanced handover characteristic.

S602, the terminal performs a handover from the second cell to the third cell according to the second message.

The implementation principles and processes of S601 and S602 can be referred to the aforementioned embodiments and will not be further elaborated.

S603, if the network device detects that the terminal has recorded an RLF report during a process of performing handover from the second cell to the third cell according to the second message, a failure indication message is generated.

The failure indication message is used for parameter optimization of cell handover, and is also used to indicate that there is a connection failure between the terminal and the cell during the handover process.

In an example, after the terminal successfully performs the handover from the second cell to the third cell according to the second message, for example, the network device may transmit a message to the terminal through the third cell to inquire whether the terminal has recorded an RLF report during the process of performing the handover from the second cell to the third cell.

In another example, after successfully performing the handover to the third cell, the terminal may transmit a message to the third cell to inform, through the third cell, the condition that the RLF report is recorded by the terminal during the process of performing the handover from the second cell to the third cell, to the network device.

In one embodiment, if the network device detects that the terminal has recorded an RLF report during the process of performing the handover from the second cell to the third cell according to the second message, such as the RLF report generated by the terminal when an RLF occurs in the second cell in the above embodiment, the network device may generate a failure indication message.

In this embodiment, in the cell handover with the enhanced handover characteristic, if the network device detects that the terminal has recorded an RLF report during the process of performing the handover from the second cell to the third cell according to the second message, a failure indication message is generated, to trigger the network device to generate a failure indication message, i.e. triggering MRO, to enhance the failure indication message when there is no RRC connection reestablishment or establishment, conducting a more comprehensive MRO process for connection failures that occur during the cell handover with an enhanced handover characteristic.

In some embodiments, the network device detects that a terminal records an RLF report during the process of performing the handover from the second cell to the third cell according to the second message, if the RLF report transmitted by the terminal is received, the RLF report is added to the failure indication message to enrich the failure indication information.

Figure 7:
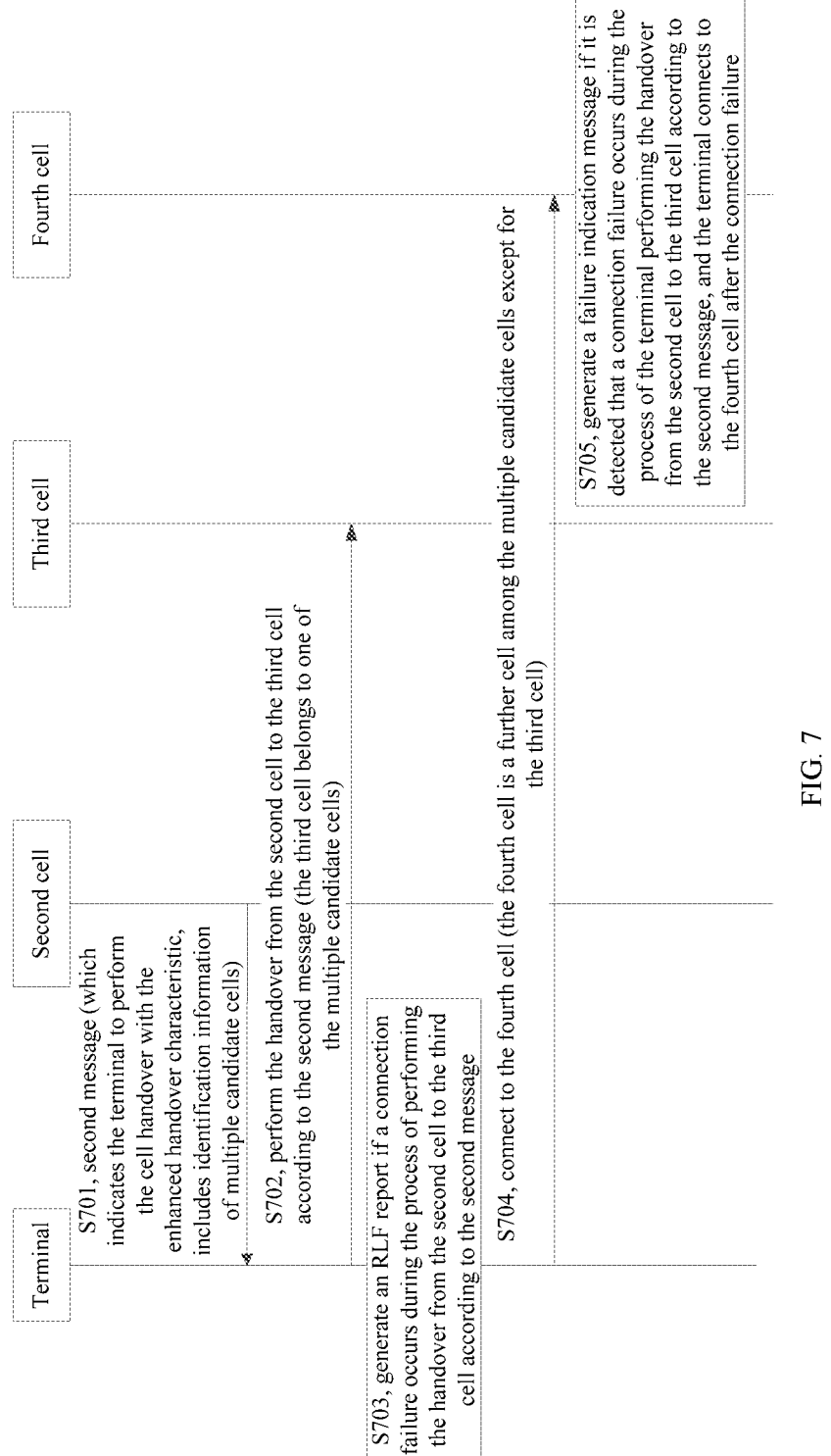
FIG. 7 is a schematic flowchart of a cell handover method provided by another embodiment of the present application.

FIG. 7 is a schematic flowchart of a cell handover method provided in another embodiment of the present application. As shown in FIG. 7, the method of this embodiment may include the following steps.

S701, the network device transmits a second message to the terminal, where the second message is used to indicate the terminal to perform the CHO, and the second message includes identification information of multiple candidate cells.

The implementation principle and process of S701 can be referred to the aforementioned embodiments and will not be further elaborated.

S702, the terminal performs handover from the second cell to the third cell according to the second message, and the third cell belongs to one of multiple candidate cells.

In one embodiment, after receiving the second message, the terminal selects the third cell as the target cell from the multiple candidate cells according to its own monitoring information, and performs the handover from the second cell to the third cell.

S703, if the terminal fails to connect during the process of performing the handover from the second cell to the third cell according to the second message, an RLF report is generated.

The terminal fails to connect during the process of performing the handover from the second cell to the third cell includes: the terminal fails to perform the handover when the terminal performs the handover from the second cell to the third cell, or an RLF occurs in the third cell after the terminal successfully performs the handover from the second cell to the third cell.

In one embodiment, if the terminal fails to perform the handover when the terminal performs the handover from the second cell to the third cell, the reason for the connection failure in the RLF report is the handover failure, and thus the terminal-failed cell is the second cell, and the timing duration is elapsed time from reception of the second message to the occurrence of the handover failure. If an RLF occurs in the third cell after the terminal successfully performs the handover from the second cell to the third cell, the reason for the connection failure in the RLF report is the RLF, and thus the terminal-failed cell is the third cell, and the timing duration is elapsed time from reception of the second message to the occurrence of RLF in the third cell.

S704, the terminal connects to the fourth cell, where fourth cell is a further cell among the multiple candidate cells except for the third cell.

In one embodiment, when the terminal transmits a connection failure during performing the handover from the second cell to the third cell, the terminal can continue to select a fourth cell from the remaining multiple candidate cells and connect to the fourth cell.

S705, if the network device detects a connection failure during the process of the terminal performing the handover from the second cell to the third cell according to the second message, and the terminal connects to the fourth cell after the connection failure, the network device generates a failure indication message in the fourth cell.

The terminal connecting to the fourth cell includes: the terminal successfully connecting to the fourth cell or the terminal not successfully connecting to the fourth cell.

In one embodiment, if the network device detects a connection failure during the process of the terminal performing the handover from the second cell to the third cell according to the second message, and the terminal connects to the fourth cell after the connection failure, the failure indication message is generated in the fourth cell.

As an example, when connecting to the fourth cell, the terminal can indicate a connection failure during the process of performing the handover from the second cell to the third cell according to the second message, or indicate that the terminal has recorded an RLF report during the process of performing the handover from the second cell to the third cell. After receiving the indication message, the network device generates the failure indication message in the fourth cell.

In this embodiment, in the CHO handover, if the terminal device fails to perform handover from the source cell (i.e., the second cell in this embodiment) to a candidate cell (i.e., the third cell in this embodiment) and then connects to a further candidate cell (i.e., the fourth cell in this embodiment), the network device generates the failure indication message in the further candidate cell. Thus, when the CHO selects the further candidate cell for connection and no RRC connection reestablishment or establishment occurs, the network device is triggered to generate a failure indication message, that is, MRO is triggered, which enhances the failure indication message and more comprehensively conducts the MRO process for connection failures that occur in CHO.

In some embodiments, if the terminal successfully connects to the fourth cell, the terminal may transmit an RLF report to the fourth cell, and the network device adds the RLF report received through the fourth cell to the failure indication message to enrich the content of the failure indication message.

In some embodiments, if the network device detects a handover failure when the terminal performs the handover from the second cell to the third cell according to the second message, for example, if the terminal-failed cell in the RLF report is the second cell, the network device transmits a failure indication message to the second cell through the fourth cell; and/or, if the network device detects that the terminal successfully performs the handover from the second cell to the third cell according to the second message and the third cell transmits an RLF, for example, if the terminal-failed cell in the RLF report is the third cell, the network device transmits a failure indication message to the third cell through the fourth cell. Therefore, the failure indication message is transmitted to the cell where the failure occurred in order to optimize the handover parameters in the corresponding cell.

In some embodiments, the failure indication message includes one or more of the following: identification information of a candidate cell to which the terminal connects in CHO, whether the terminal successfully connects to a candidate cell in the CHO, residence information of the terminal in a candidate cell after the terminal successfully connects to the candidate cell in the CHO, the RLF report, and identification information of the terminal. Among others, identification information of the terminal includes: identification information of the terminal in the target cell to which the terminal successfully connects in the CHO, and/or identification information of the terminal in the source cell in the CHO.

In one embodiment, the residence information of the terminal in a candidate cell after a successful connection between the terminal and the candidate cell in the CHO is used to indicate whether the terminal is stable in residence after a successful connection with the candidate cell. Therefore, the residence information can include the result of whether the terminal is stable in residence, such as "yes" or "no", or the duration of residence.

Within a cell, different terminals have unique identification information within this cell.

Taking the embodiment shown in FIG. 7 as an example, if the terminal fails to perform the handover from the second cell to the third cell and successfully connects to the fourth cell after the failure, the failure indication message includes one or more of the following: identification information of the third cell, a failure identification of a failure connection between the terminal and the third cell, an RLF report, and identification information of the terminal, where identification information of the terminal includes identification information of the terminal in the fourth cell and/or identification information of the terminal in the second cell.

Taking the embodiment shown in FIG. 7 as an example, if an RLF occurs in the third cell after the terminal successfully performs the handover from the second cell to the third cell, and the terminal successfully connects to the fourth cell after the failure, the failure indication message includes one or more of the following: identification information of the third cell, a successful identification of a successful connection between the terminal and the third cell, residence information of the terminal in the third cell, an RLF report, and identification information of the terminal, where identification information of the terminal includes identification information of the terminal in the fourth cell and/or identification information of the terminal in the second cell.

Taking the embodiment shown in FIG. 6 as an example, if the terminal performs the handover from the first cell to the second cell through a traditional handover, and then performs the handover from the second cell to the third cell through the CHO, and an RLF occurs in the second cell when the terminal performs the handover from the second cell to the third cell through the CHO, and the terminal successfully performs handover to the third cell, the failure indication message includes one or more of the following: identification information of the third cell, a successful identification of a successful connection between the terminal and the third cell, residence information of the terminal in the third cell, an RLF report, and identification information of the terminal, where identification information of the terminal includes identification information of the terminal in the third cell and/or identification information of the terminal in the second cell.

In combination with the network device generates the corresponding failure indication message when performing the RRC connection reestablishment, RRC connection establishment, connection with a candidate cell through the CHO between a terminal and a cell, as an example, the failure indication message is as shown in the table below:

handover has been added to the handover report message, and after a terminal fails to connect to a candidate cell in the CHO and then connects to a further candidate cell, corresponding failure indication message and handover report message can be generated for the connection failure between the terminal and the candidate cell in the CHO.

When the terminal-failed cell in the RLF report is the second cell, the network device transmits a failure indication message to the second cell through the fourth cell, and generates a handover report message in the second cell according to the failure indication message. When the terminal-failed cell in the RLF report is the third cell, the network device transmits a failure indication message to the third cell through the fourth cell, and generates a handover report message in the third cell according to the failure indication message.

| MESSAGE CONTENT | DESCRIPTION |
|---|---|
| Optional branches | Triggered by the RRC connection reestablishment request of the terminal, triggered by the RRC connection establishment request, or triggered by the connection with a candidate cell for the CHO |
| 1. RRC connection reestablishment 1.1. information carried in RRC connection reestablishment request message | RRC connection reestablishment branch |
| 1.2. RLF report of the terminal | Optional content, if the network device receives the RLF report, the RLF report is carried in a failure indication message |
| 2. RRC establishment | RRC connection establishment branch |
| 2.1. RLF report of the terminal | Optional content, if network device receives the RLF report, the RLF report is carried in a failure indication message |
| 3. Connection with a candidate cell for the CHO | Connection with a candidate cell for CHO branch |
| 3.1. identification information of a candidate cell | identification information of a candidate cell to which the terminal connects |
| 3.2. failed connection or successful connection | failed connection or successful connection between the terminal and a candidate cell |
| 3.3. whether there is a stable residence after a successful connection | whether the terminal is stable in residence in a candidate cell after successfully connecting to the candidate cell |
| 3.4. RLF report of the terminal | Optional content, if network device receives the RLF report, the RLF report is carried in a failure indication message |
| 3.5. identification information of the terminal | identification information of the terminal in the target cell to which the terminal successfully connects in the CHO, and/or identification information of the terminal in the source cell in the CHO |

In some embodiments, after generating a failure indication message through the fourth cell, the network device can also generate a handover report message according to the failure indication message. The handover report message includes a failure reason, the failure reason includes one or more of the following: early handover, late handover, and a handover to a wrong cell. The handover report message further includes one or more of the following: identification information of a candidate cell to which the terminal connects in the CHO, whether the terminal successfully connects to a candidate cell in the CHO, residence information of the terminal in a candidate cell after the terminal successfully connects to the candidate cell in the CHO, and the RLF report. Therefore, the content related to the CHO In one embodiment, when the network device generates a handover report message in the third cell, it can further transmit the handover report message to the second cell through the third cell, and the second cell can adjust the handover parameters according to early handover, late handover, or the handover to the wrong cell.

In combination with the network device generates the corresponding handover report message according to the failure indication message corresponding to the RRC connection reestablishment, the failure indication message corresponding to RRC establishment, and the failure indication message corresponding to the connection between the terminal and a candidate cell in the CHO, as an example, the handover report message is as shown in the table below:

| MESSAGE CONTENT | DESCRIPTION |
|---|---|
| Types of the handover report | The analyzed failure reason for a failed cell, such as early handover, late handover, handover to a wrong cell, etc. |
| Source cell of the handover | CGI of the source cell |
| Target cell of the handover | CGI of the target cell |
| RRC reestablishment cell | CGI of the cell connected through the RRC connection reestablishment or establishment by the terminal |

-continued

| MESSAGE CONTENT | DESCRIPTION |
|---|---|
| RLF report of the terminal | Optional content, if there is an RLF report carried in the failure indication message, the RLF report is also carried in the handover report massage. |
| Identification information of a candidate cell connected in CHO | Such as the CGI of a candidate cell to which the terminal connects in the CHO |
| Successful connection or failed connection with a candidate cell in the CHO | Successful connection or failed connection with a candidate cell by the terminal in the CHO |
| Whether there is a stable residence after a connection with a candidate cell in the CHO | Whether the terminal is stable in residence in a candidate cell after successfully connecting to the candidate cell |

Figure 8:
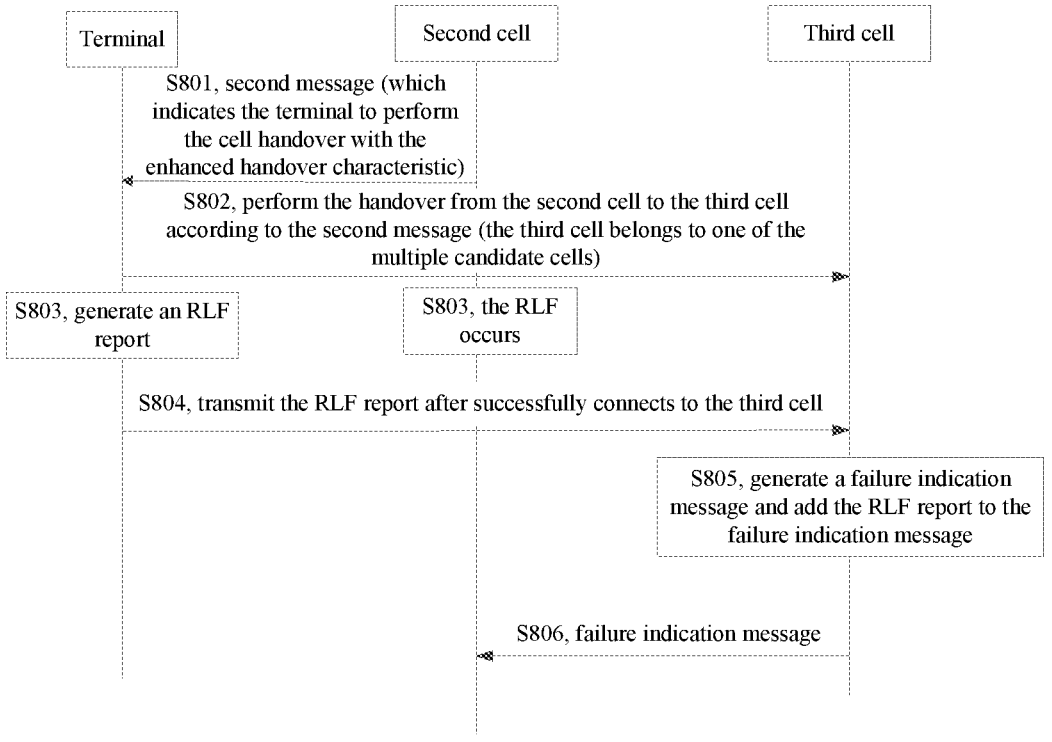
FIG. 8 is a schematic flowchart of a cell handover method provided by another embodiment of the present application.

FIG. 8 is a schematic flowchart of a cell handover method provided in another embodiment of the present application. As shown in FIG. 8, the method of this embodiment may include the following steps.

S801, the network device transmits a second message to the terminal, where the second message is used to indicate the terminal to perform DAPS, and the second message includes identification information of the target cell in the DAPS.

S802, the terminal performs handover from the second cell to the third cell according to the second message, where the third cell is the target cell in the DAPS handover.

S803, if an RLF occurs in the second cell, the terminal generates an RLF report. The implementation processes of S801-S803 can refer to the description of the aforementioned embodiments and will not be further elaborated.

S804, after successfully performing the handover to the third cell, the terminal transmits the RLF report to the network device.

For example, after the terminal successfully performs the handover to the third cell, an indication message can be transmitted to the network device through the third cell to indicate that an RLF report is recorded on the terminal when performing the handover from the second cell to the third cell. After receiving the indication message, the network device transmits an obtaining request to the terminal to obtain the RLF report. The terminal responds to the request and transmits the RLF report to the network device.

S805, the network device generates a failure indication message in the third cell and adds the RLF report to the failure indication message, where the RLF report indicates that an RLF occurs in the second cell during the DAPS handover.

In one embodiment, an RLF occurs in the second cell when the terminal performs the DAPS handover, optimization of handover parameters is also required for the RLF in the second cell even though the terminal has successfully connected to the third cell and RRC connection reestablishment or RRC connection establishment is not needed. Therefore, if the network device detects that the terminal has recorded an RLF report when the terminal performs the handover from the second cell to the third cell according to the second message, or detects an RLF in the second cell when the terminal performs the handover from the second cell to the third cell according to the second message, a failure indication message is generated. When the RLF report transmitted by the terminal is received, the network device adds the RLF report to the failure indication message.

In one embodiment, if the terminal fails to successfully connect to the third cell, the network device cannot receive the RLF report transmitted by the terminal. The network device can generate a failure indication message when it is detected that the terminal has recorded an RLF report when the terminal performs the handover from the second cell to the third cell according to the second message, or when it is detected that an RLF occurs in the second cell when the terminal performs the handover from the second cell to the third cell according to the second message, at this point, the failure indication message does not include an RLF report.

S806, the network device transmits a failure indication message to the second cell through the third cell.

In one embodiment, in a case that the RLF report indicates an RLF occurs in the second cell during the DAPS handover, or when the network device detects that an RLF occurs in the second cell when the terminal performs the handover from the second cell to the third cell, at this point, the cell that failed the connection is the second cell. The network device transmits a failure indication message to the second cell through the third cell to optimize the handover parameters in the second cell.

In this embodiment, in the DAPS handover, if the terminal device successfully performs handover from the source cell (i.e. the second cell in this embodiment) to the target cell (i.e. the third cell in this embodiment), but an RLF occurs in the source cell before the terminal disconnects from the source cell, the network device generates a failure indication message in the target cell and transmits the failure indication message to the source cell, and when there is no RRC connection reestablishment or establishment, network device is triggered to generate the failure indication message, that is, MRO is triggered, which enhances the failure indication message and more comprehensively conducts the MRO process for connection failures in the DAPS.

In combination with the network device generates failure indication messages when the RRC connection is reestablished, RRC is established, the terminal connects to a candidate cell in the CHO, and the DAPS handover fails (including an RLF occurs in the source cell), as an example, the failure indication message is as shown in the table below:

| MESSAGE CONTENT | DESCRIPTION |
|---|---|
| Optional branches | Triggered by the RRC connection reestablishment request of the terminal, triggered by the RRC connection establishment request, triggered by the connection with a candidate cell for the CHO, or triggered by the DAPS handover fails |

-continued

| MESSAGE CONTENT | DESCRIPTION |
| --- | --- |
| 1. RRC connection reestablishment 1.1. information carried in RRC connection reestablishment request message | RRC connection reestablishment branch |
| 1.2. RLF report of the terminal | Optional content, if the network device receives the RLF report, the RLF report is carried in a failure indication message |
| 2. RRC establishment | RRC connection establishment branch |
| 2.1. RLF report of the terminal | Optional content, if network device receives the RLF report, the RLF report is carried in a failure indication message |
| 3. Connection with a candidate cell for the CHO | Connection with a candidate cell for CHO branch |
| 3.1. identification information of a candidate cell | identification information of a candidate cell to which the terminal connects |
| 3.2. failed connection or successful connection | failed connection or successful connection between the terminal and a candidate cell |
| 3.3. whether there is a stable residence after a successful connection | whether the terminal is stable in residence in a candidate cell after successfully connecting to the candidate cell |
| 3.4. RLF report of the terminal | Optional content, if network device receives the RLF report, the RLF report is carried in a failure indication message |
| 3.5. identification information of the terminal | identification information of the terminal in the target cell to which the terminal successfully connects in the CHO, and/or identification information of the terminal in the source cell in the CHO |
| 4. DAPS handover failure 4.1. RLF report of the terminal | Optional content, if the network device receives the RLF report, the RLF report is carried in a failure indication message |

In some embodiments, after generating a failure indication message through the third cell, the network device can also generate a handover report message according to the failure indication message. The handover report message includes identification information of a target cell in the DAPS handover, and the identification information of the target cell in the DAPS handover is added to the handover report message and the completeness of the handover report message is improved. For example, if the terminal performs handover from the first cell to the second cell before In combination with the network device generates a handover report message according to the failure indication message corresponding to the RRC connection reestablishment, the failure indication message corresponding to the RRC establishment, the failure indication message corresponding to the connection between the terminal and a candidate cell in the CHO, and the failure indication message corresponding to the DAPS handover failure, as an example, the handover report message is as shown in the table below:

| MESSAGE CONTENT | DESCRIPTION |
| --- | --- |
| Types of the handover report | The analyzed failure reason for a failed cell, such as early handover, late handover, handover to a wrong cell, etc. |
| Source cell of the handover | CGI of the source cell |
| Target cell of the handover | CGI of the target cell |
| RRC reestablishment cell | CGI of the cell connected through the RRC connection reestablishment or establishment by the terminal |
| RLF report of the terminal | Optional content, if there is an RLF report carried in the failure indication message, the RLF report is also carried in the handover report massages. |
| Identification information of a candidate cell connected in CHO | Such as the CGI of a candidate cell to which the terminal connects in the CHO |
| Successful connection or failed connection with a candidate cell in the CHO | Successful connection or failed connection with a candidate cell by the terminal in the CHO |
| Whether there is a stable residence after a connection with a candidate cell in CHO | Whether the terminal is stable in residence in a candidate cell after successfully connecting to the candidate cell |
| Identification information of the target cell for DAPS | In the scenario where no RRC connection reestablishment or RRC connection establishment has occurred, the type of the handover report is present when handover to a wrong cell, to inform the source cell (i.e., the first cell in this embodiment) that this cell is selected as the target cell | performing handover from the second cell to the third cell through the DAPS, and an RLF occurs in the second cell during the DAPS handover, it may be due to handover to the wrong cell when performing the handover from the first cell to the second cell. The target cell in the DAPS handover is added to the handover report message in order to inform the first cell that the target cell is a suitable handover cell.

Figure 9:
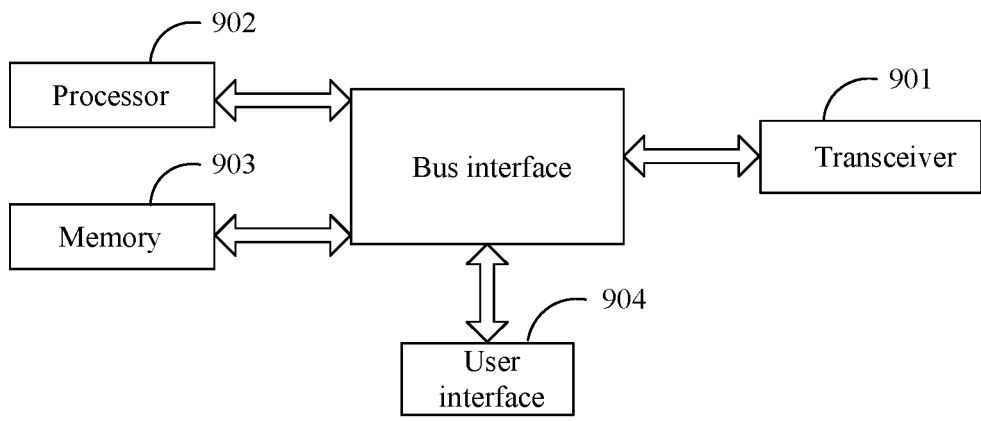
FIG. 9 is a schematic structure diagram of a cell handover apparatus provided by an embodiment of the present application.

On the terminal side, an embodiment of the present application provides a cell handover apparatus, as shown in FIG. 9. The cell handover apparatus of this embodiment can be a terminal, and the cell handover apparatus can include a transceiver 901, a processor 902, and a memory 903.

The transceiver 901 is configured to receive and transmit data under the control of the processor 902.

In FIG. 9, a bus architecture can include any number of interconnected buses and bridges, through which various circuits of one or more processors represented by the processor 902 and a memory represented by the memory 903 are linked together. The bus architecture can also link various other circuits of, for example, a peripheral device, a voltage regulator, and a power management circuit, which are well known in the art. Therefore, further description will be omitted herein. The bus interface provides an interface. The transceiver 901 can be a plurality of elements, that is, including a transmitter and a receiver, and provides units for communicating with various other apparatuses over transmission media. These transmission media include wireless channels, wired channels, optical cables and other transmission media. In one embodiment, the cell handover apparatus can also include user interface 904. For different user equipment, user interface 904 can also be an interface that can connect the required device externally and internally. The connected device includes but is not limited to a keypad, a display, a speaker, a microphone, a joystick, etc.

The processor 902 is responsible for managing the bus architecture and general processing, and the memory 903 can store data used by the processor 902 when performing an operation.

In one embodiment, the processor 902 can be a central processing unit (CPU), an application specific integrated circuit (ASIC), a field-programmable gate array (FPGA) or a complex programmable logic device (CPLD). The processor can also use a multi-core architecture.

The processor 902 is used to execute any of the methods related to the terminal provided in the embodiment of the present application according to the obtained executable instructions by calling the computer program stored in the memory 903. The processor and memory can also be physically arranged separately.

In one embodiment, when executing the computer program stored in the memory 903, the processor 902 implements the following operations: receiving a first message transmitted by a first cell, where the first message indicates the terminal to perform a cell handover with an enhanced handover characteristic or a cell handover with a non-enhanced handover characteristic, and the cell handover with the enhanced handover characteristic includes a conditional handover (CHO) or a dual active protocol stack (DAPS) handover; performing a handover from the first cell to a second cell according to the first message; receiving a second message transmitted by the second cell, where the second message indicates the terminal to perform the cell handover with the enhanced handover characteristic; and performing a handover from the second cell to a third cell according to the second message, and generating an RLF report and recording timing duration in the RLF report if an RLF occurs in the second cell, where the timing duration is elapsed time from reception of the first message by the terminal to occurrence of the RLF in the second cell.

In one embodiment, the processor 902 is further configured to perform the following operations: restarting a reporting timer of the terminal when the terminal receives the first message; storing a current value of the reporting timer as first duration and restarting the reporting timer again when the terminal receives the second message;

the generating the RLF report and recording the timing duration in the RLF report if the RLF occurs in the second cell includes: generating the RLF report if the RLF occurs in the second cell; and determining a current value of the reporting timer as second duration, and recording the first duration and the second duration in the RLF report.

In one embodiment, when the first message indicates the terminal to perform the cell handover with the non-enhanced handover characteristic, the processor 902 is further configured to perform the following operations: restarting a reporting timer of the terminal when the terminal receives the first message;

the generating the RLF report and recording the timing duration in the RLF report if the RLF occurs in the second cell includes: generating the RLF report and recording a current value of the reporting timer as the timing duration in the RLF report if the RLF occurs in the second cell.

In one embodiment, the processor 902 is further configured to perform the following operation: restarting the reporting timer again after the terminal completes the handover from the second cell to the third cell according to the second message.

It should be noted here that the above-mentioned apparatus provided by the present application can implement all the method steps implemented by the terminal in the above-mentioned method embodiments, and can achieve the same effect. The same parts and beneficial effects in the embodiment as those in the method embodiments will not be repeated herein.

Figure 10:
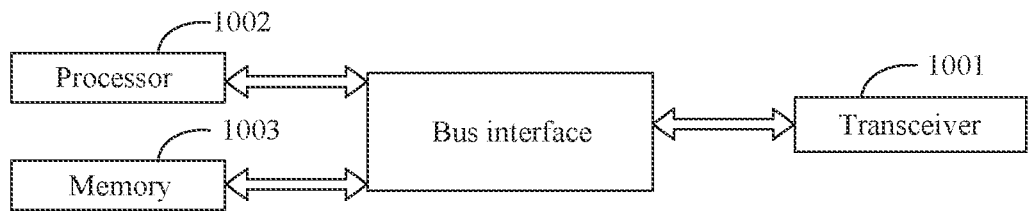
FIG. 10 is a schematic structure diagram of a cell handover apparatus provided by another embodiment of the present application.

On the network side, the embodiment of the present application provides a cell handover apparatus, as shown in FIG. 10. The cell handover apparatus of this embodiment can be a network device, and the cell handover apparatus includes a transceiver 1001, a processor 1002, and a memory 1003.

The transceiver 1001 is configured to receive and transmit data under the control of the processor 1002.

In FIG. 10, a bus architecture can include any number of interconnected buses and bridges, through which various circuits of one or more processors represented by the processor 1002 and a memory represented by the memory 1003 are linked together. The bus architecture can also link various other circuits of, for example, a peripheral device, a voltage regulator, and a power management circuit, which are well known in the art. Therefore, further description will be omitted herein. The bus interface provides an interface. The transceiver 1001 can be a plurality of elements, that is, including a transmitter and a receiver, and provides units for communicating with various other apparatuses over transmission media. These transmission media include wireless channels, wired channels, optical cables and other transmission media. The processor 1002 is responsible for managing the bus architecture and general processing, and the memory 1003 can store data used by the processor 1002 when performing an operation.

The processor 1002 can be a CPU, ASIC, FPGA, or CPLD, and the processor can also adopt a multi-core architecture.

The processor 1002 is used to execute any of the methods related to the network device provided in the embodiment of the present application according to the obtained executable instructions by calling the computer program stored in the memory 1003. The processor and memory can also be physically arranged separately.

In one embodiment, the processor 1002 implements the following operations when executing computer programs stored in the memory 1003: transmitting a second message to a terminal through a second cell, where the second message indicates the terminal to perform a cell handover with an enhanced handover characteristic, and the cell handover with the enhanced handover characteristic includes a CHO or a DAPS handover; and if it is detected that the terminal has recorded an RLF report during a process of performing a handover from the second cell to a third cell according to the second message, generating a failure indication message, where the failure indication message is used for parameter optimization of the cell handover.

In one embodiment, the processor 1002 is further configured to perform the following operation: adding the RLF report in the failure indication message if the RLF report transmitted by the terminal is received.

In one embodiment, when the second message indicates the terminal to perform the CHO, the third cell belongs to one of multiple candidate cells in the CHO. The processor 1002 is further configured to perform the following operation: if a connection failure is detected during the process of the terminal performing the handover from the second cell to a third cell according to the second message, and the terminal connects to a fourth cell after the connection failure, generating the failure indication message in the fourth cell, where the fourth cell is a further cell among the multiple candidate cells except for the third cell; where connection failure includes a handover failure of the terminal performing the handover from the second cell to the third cell, or occurrence of an RLF in the third cell after the terminal successfully performs the handover from the second cell to the third cell.

In one embodiment, the failure indication message includes one or more of the following: identification information of a candidate cell to which the terminal connects in CHO, whether the terminal successfully connects to a candidate cell in the CHO, residence information of the terminal in a candidate cell after the terminal successfully connects to the candidate cell in the CHO, the RLF report, and identification information of the terminal. The identification information of the terminal includes: identification information of the terminal in the target cell to which the terminal successfully connects in the CHO, and/or identification information of the terminal in the source cell in the CHO.

In one embodiment, the processor 1002 is further configured to perform the following operations: generating a handover report message according to the failure indication message, where the failure report message includes a failure reason, the failure reason includes one or more of the following: early handover, late handover, and a handover to a wrong cell, and the handover report message further includes one or more of the following: identification information of a candidate cell to which the terminal connects in the CHO, whether the terminal successfully connected to a candidate cell in the CHO, residence information of the terminal in a candidate cell after the terminal successful connects to the candidate cell in the CHO, and the RLF report.

In one embodiment, when the second message indicates the terminal to perform the DAPS handover, and the third cell is a target cell in the DAPS handover, the processor is further configured to perform the following operations: adding the RLF report in the failure indication message if the RLF report transmitted by the terminal is received; transmitting the failure indication message to the second cell through the third cell if the RLF report indicates that an RLF occurs in the second cell during the DAPS handover.

In one embodiment, the processor 1002 is further configured to perform the following operation: generating a handover report message according to the failure indication message, where the handover report message includes identification information of the target cell in the DAPS handover.

It should be noted here that the above-mentioned apparatus provided by the present application can implement all the method steps implemented by the network device in the above-mentioned method embodiments, and can achieve the same effect. The same parts and beneficial effects in the embodiment as those in the method embodiments will not be repeated herein.

Figure 11:
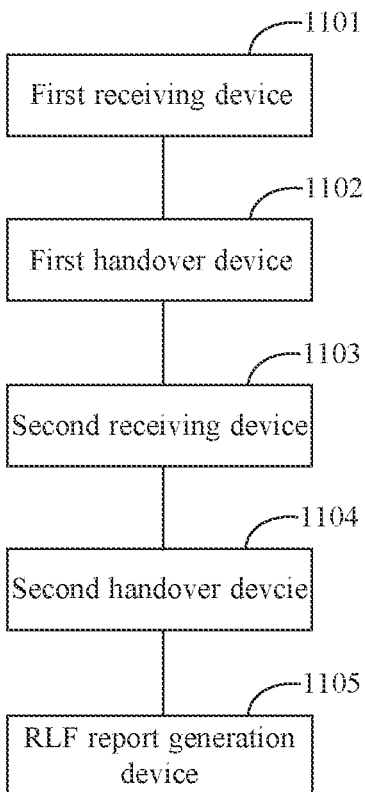
FIG. 11 is a schematic structure diagram of a cell handover apparatus provided by another embodiment of the present application.

On the terminal side, the embodiment of the present application further provides a cell handover apparatus, as shown in FIG. 11. The cell handover apparatus of this embodiment can be a terminal, the cell handover apparatus includes a first receiving device 1101, a first handover device 1102, a second receiving device 1103, a second handover device 1104, and an RLF report generation device 1105.

The first receiving device 1101 is configured to receive a first message transmitted by a first cell, where the first message indicates the terminal to perform a cell handover with an enhanced handover characteristic or a cell handover with a non-enhanced handover characteristic, and the cell handover with the enhanced handover characteristic includes a conditional handover CHO or a dual active protocol stack DAPS handover.

The first handover device 1102 is configured to perform a handover from the first cell to a second cell according to the first message.

The second receiving device 1103 is configured to receive a second message transmitted by the second cell, where the second message indicates the terminal to perform the cell handover with the enhanced handover characteristic.

The second handover device 1104 is configured to perform handover from the second cell to a third cell according to the second message.

The RLF report generation device 1105 is configured to generate an RLF report and recording timing duration in the RLF report if an RLF occurs in the second cell, where the timing duration is elapsed time from reception of the first message by the terminal to occurrence of the RLF in the second cell.

In one embodiment, the apparatus further includes:

a first restart device, configured to restart a reporting timer of the terminal when the terminal receives the first message;

a second restart device, configured to store a current value of the reporting timer as first duration and restart the reporting timer again when the terminal receives the second message;

the RLF report generation device 1105 is configured to:

generate the RLF report if the RLF occurs in the second cell; and determine a current value of the reporting timer as second duration, and recording the first duration and the second duration in the RLF report.

In one embodiment, when the first message indicates the terminal to perform the cell handover with the non-enhanced handover characteristic, the apparatus further includes:

a third restart device, configured to restart a reporting timer of the terminal when the terminal receives the first message;

the RLF report generation device 1105 is configured to:

generate the RLF report and record a current value of the reporting timer as the timing duration in the RLF report if the RLF occurs in the second cell.

In one embodiment, the apparatus further includes:

a fourth restart device, configured to restart the reporting timer again after the terminal completes the handover from the second cell to the third cell according to the second message.

It should be noted here that the above-mentioned apparatus provided by the present application can implement all the method steps implemented by the terminal in the above-mentioned method embodiments, and can achieve the same effect. The same parts and beneficial effects in the embodiment as those in the method embodiments will not be repeated herein.

Figure 12:
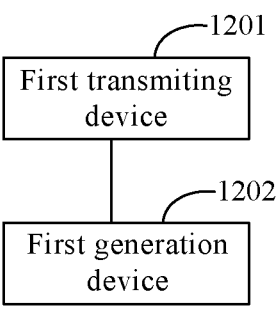
FIG. 12 is a schematic structure diagram of a cell handover apparatus provided by another embodiment of the present application.

On the network side, the embodiment of the present application further provides a cell handover apparatus, as shown in FIG. 12. The cell handover apparatus of this embodiment can be a network device, and the cell handover apparatus includes a first transmitting device 1201 and a first generating device 1202.

The first transmitting device 1201 is configured to transmit a second message to a terminal through a second cell, where the second message indicates the terminal to perform a cell handover with an enhanced handover characteristic, and the cell handover with the enhanced handover characteristic includes a CHO or a DAPS handover.

The first generation device 1202 is configured to generate a failure indication message if it is detected that the terminal has recorded an RLF report during a process of performing a handover from the second cell to a third cell according to the second message, where the failure indication message is used for parameter optimization of the cell handover.

In one embodiment, the apparatus further includes:

a second addition device, configured to add the RLF report in the failure indication message if the RLF report transmitted by the terminal is received.

In one embodiment, when the second message indicates the terminal to perform the CHO, and the third cell belongs to one of multiple candidate cells in the CHO, and the apparatus further includes:

a second generation device, configured to generate the failure indication message in a fourth cell if a connection failure is detected during the process of the terminal performing handover from the second cell to the third cell according to the second message, and the terminal connects to the fourth cell after the connection failure, where the fourth cell is a further cell among the multiple candidate cells except for the third cell;

where the connection failure includes a handover failure of the terminal performing the handover from the second cell to the third cell, or occurrence of an RLF in the third cell after the terminal successfully performs the handover from the second cell to the third cell.

In one embodiment, the failure indication message includes one or more of the following: identification information of a candidate cell to which the terminal connects in the CHO, whether the terminal successfully connects to a candidate cell in the CHO, residence information of the terminal in a candidate cell after the terminal successfully connects to the candidate cell in the CHO, the RLF report, and identification information of the terminal; where the identification information of the terminal includes: identification information of the terminal in the target cell to which the terminal successfully connects in the CHO, and/or identification information of the terminal in a source cell in the CHO.

In one embodiment, the apparatus further includes:

a third generation device, configured to generate a handover report message according to the failure indication message;

where the handover report message includes a failure reason, the failure reason includes one or more of the following: early handover, late handover, and a handover to a wrong cell, and the handover report message further includes one or more of the following: identification information of a candidate cell to which the terminal connects in the CHO, whether the terminal successfully connected to a candidate cell in the CHO, residence information of the terminal in a candidate cell after the terminal successful connects to the candidate cell in the CHO, and the RLF report.

In one embodiment, when the second message indicates the terminal to perform the DAPS handover, and the third cell is a target cell in the DAPS handover, and the apparatus further includes:

a first addition device, configured to add the RLF report in the failure indication message if the RLF report transmitted by the terminal is received; and a second transmitting device, configured to transmit the failure indication message to the second cell through the third cell if the RLF report indicates that an RLF occurs in the second cell during the DAPS handover.

In one embodiment, the apparatus further includes:

a fourth generation device, configured to generate a handover report message according to the failure indication message, where the handover report message includes identification information of the target cell in the DAPS handover.

It should be noted here that the above-mentioned apparatus provided by the present application can implement all the method steps implemented by the network device in the above-mentioned method embodiments, and can achieve the same effect. The same parts and beneficial effects in the embodiment as those in the method embodiments will not be repeated herein.

It should be noted that the division of units in the embodiment of the present application is schematic and only serves as a logical functional division. In actual implementation, there may be other division ways. In addition, each functional device in each embodiment of the application can be integrated in one processing unit, or each unit can exist physically independently, or two or more units can be integrated in one unit. The integrated units mentioned above can be implemented in both hardware and software functional units.

If the above-mentioned integrated unit is implemented as a software functional unit and sold or used as an independent product, it may be stored in a processor-readable storage medium. Based on this understanding, the embodiments of the application, in essence, or the part that contributes to the prior art, or the whole or part of the embodiments, may be embodied in the form of a software product, which is stored in a storage medium, including a number of instructions to enable a computer device (which may be a personal computer, a server, or a network device, etc.) or a processor to execute all or part of the steps of the method described in the various embodiments of the present application. The aforementioned storage media include: a U disk, a mobile hard disk, a read-only memory (ROM), a random access memory (RAM), a magnetic disc or an optical disc and other media that can store program codes.

On the terminal side, the embodiment of the present application provides a processor-readable storage medium, the processor-readable storage medium stores a computer program for causing the processor to execute any of the methods related to the terminal provided in the embodiment of the present application. Enable the processor to implement all the method steps implemented by the terminal in the above method embodiments, and achieve the same effects. Here, the same parts and beneficial effects in this embodiment as in the method embodiment will not be elaborated in detail.

On the network side, the embodiment of the present application provides a processor-readable storage medium, the processor-readable storage medium stores a computer program for causing the processor to execute any of the methods related to network device provided in the embodiment of the present application. Enable the processor to implement all the method steps implemented by the network device in the above method embodiments, and achieve the same effects. Here, the same parts and beneficial effects in this embodiment as in the method embodiment will not be elaborated in detail.

The processor-readable storage medium can be any available medium or data storage device that the processor can access, including but not limited to magnetic memory (such as floppy disks, hard disks, magnetic tapes, magneto-optical disks (MO), etc.), optical memory (such as CD, DVD, BD, HVD, etc.), and semiconductor memory (such as ROM, EPROM, EEPROM, non-volatile memory (NAND FLASH), solid-state drive (SSD), etc.).

On the terminal side, the embodiment of the present application provides a computer program product that includes instructions. When the instructions are run on a computer, the computer executes all the method steps implemented by the terminal in the above method embodiment, and can achieve the same effect. Here, the same parts and beneficial effects in this embodiment as in the method embodiment will not be elaborated in detail.

On the network side, the embodiment of the present application provides a computer program product that includes instructions. When the instructions are run on a computer, the computer executes all the method steps implemented by the network device in the above method embodiment, and can achieve the same effect. Here, the same parts and beneficial effects in this embodiment as in the method embodiment will not be elaborated in detail.

Embodiments of the present application may be provided as methods, systems, or computer program products. Therefore, the present application may take the form of complete hardware embodiments, complete software embodiments, or embodiments combining software and hardware aspects. Moreover, the present application may take the form of a computer program product implemented on one or more computer available storage medium (including but not limited to magnetic-disk memory, optical memory, etc.) containing computer available program code.

The present application is described with reference to the flowchart and/or block diagram of the method, apparatus, and computer program product according to the embodiments of the present application. It should be understood that each process and/or box in a flowchart and/or block diagram, as well as the combination of processes and/or boxes in the flowchart and/or block diagram, can be implemented by computer executable instructions. These computer executable instructions can be provided to processors of general-purpose computers, specialized computers, embedded processors, or other programmable data processing devices to generate a machine, and instructions executed by processors of computers or other programmable data processing devices generate apparatus for implementing functions specified in one or more processes of the flowchart and/or one or more boxes of the block diagram.

These processor executable instructions can also be stored in processor readable memory that can guide computers or other programmable data processing devices to work in a specific way, and the instructions stored in the processor readable memory generate manufactured products including instruction apparatus, the instruction apparatus implements the functions specified in one or more processes of the flowchart and/or one or more boxes of the block diagram.

These processor executable instructions can also be loaded onto a computer or other programmable data processing devices to perform a series of operational steps on the computer or other programmable devices to generate computer-implemented processing, and the instructions executed on the computer or other programmable devices provide steps for implementing the functions specified in one or more processes of the flowchart and/or one or more boxes of the block diagram.

Various modifications and variations to the present application without departing from the spirit and scope of the present application. In this way, if these modifications and variations of the present application fall within the scope of the claims and their equivalent technologies, the present application also intends to include these modifications and variations.

The invention claimed is:

1. A cell handover method, applied to a terminal, comprising:
   receiving a first message transmitted by a first cell, wherein the first message indicates the terminal to perform a cell handover with an enhanced handover characteristic or a cell handover with a non-enhanced handover characteristic, and the cell handover with the enhanced handover characteristic comprises a conditional handover (CHO) or a dual active protocol stack (DAPS) handover;
   performing a handover from the first cell to a second cell according to the first message;
   receiving a second message transmitted by the second cell, wherein the second message indicates the terminal to perform the cell handover with the enhanced handover characteristic; and
   performing a handover from the second cell to a third cell according to the second message, and generating a radio link failure (RLF) report and recording timing duration in the RLF report if an RLF occurs in the second cell, wherein the timing duration is elapsed time from reception of the first message by the terminal to occurrence of the RLF in the second cell.

2. The method according to claim 1, further comprising:
   restarting a reporting timer of the terminal when the terminal receives the first message;
   storing a current value of the reporting timer as first duration and restarting the reporting timer again when the terminal receives the second message;
   the generating the RLF report and recording the timing duration in the RLF report if the RLF occurs in the second cell comprises:
   generating the RLF report if the RLF occurs in the second cell; and
   determining a current value of the reporting timer as second duration, and recording the first duration and the second duration in the RLF report.

3. The method according to claim 1, wherein when the first message indicates the terminal to perform the cell handover with the non-enhanced handover characteristic, the method further comprises:

> restarting a reporting timer of the terminal when the terminal receives the first message;
>
> the generating the RLF report and recording the timing duration in the RLF report if the RLF occurs in the second cell comprises:
>
> generating the RLF report and recording a current value of the reporting timer as the timing duration in the RLF report if the RLF occurs in the second cell.

4. The method according to claim 3, further comprising:

> restarting the reporting timer again after the terminal completes the handover from the second cell to the third cell according to the second message.

5. A non-transitory processor-readable storage medium, wherein the processor-readable storage medium stores a computer program used to enable a processor to execute the method according to claim 1.

6. A cell handover method, applied to a network device, comprising:

> transmitting a first message to a terminal through a first cell, wherein the first message indicates the terminal to perform a cell handover with an enhanced handover characteristic or a cell handover with a non-enhanced handover characteristic, to cause a handover of the terminal from the first cell to a second cell, and the cell handover with the enhanced handover characteristic comprises a conditional handover (CHO) or a dual active protocol stack (DAPS) handover;
>
> transmitting a second message to the terminal through the second cell, wherein the second message indicates the terminal to perform the cell handover with the enhanced handover characteristic; and
>
> detecting whether the terminal has recorded a radio link failure (RLF) report during a process of performing a handover from the second cell to a third cell according to the second message and when an RLF occurs in the second cell;
>
> if the terminal has recorded the RLF report, generating a failure indication message, wherein the failure indication message is used for parameter optimization of the cell handover, and timing duration is recorded in the RLF report, wherein the timing duration is elapsed time from reception of the first message by the terminal to occurrence of the RLF in the second cell.

7. The method according to claim 6, further comprising:

> adding the RLF report in the failure indication message if the RLF report transmitted by the terminal is received.

8. The method according to claim 6, wherein when the second message indicates the terminal to perform the CHO, and the third cell belongs to one of multiple candidate cells in the CHO, the method further comprises:

> if a connection failure is detected during the process of the terminal performing the handover from the second cell to the third cell according to the second message, and the terminal connects to a fourth cell after the connection failure, generating the failure indication message in the fourth cell, wherein the fourth cell is a further cell among the multiple candidate cells except for the third cell;
>
> wherein the connection failure comprises a handover failure of the terminal performing the handover from the second cell to the third cell, or occurrence of an RLF in the third cell after the terminal successfully performs the handover from the second cell to the third cell.

9. The method according to claim 6, wherein the failure indication message comprises one or more of the following: identification information of a candidate cell to which the terminal connects in the CHO, whether the terminal successfully connects to a candidate cell in the CHO, residence information of the terminal in a candidate cell after the terminal successfully connects to the candidate cell in the CHO, the RLF report, and identification information of the terminal;

> wherein the identification information of the terminal comprises: identification information of the terminal in a target cell to which the terminal successfully connects in the CHO, and/or identification information of the terminal in a source cell in the CHO.

10. The method according to claim 9, further comprising:

> generating a handover report message according to the failure indication message;
>
> wherein the handover report message comprises a failure reason, the failure reason comprises one or more of the following: early handover, late handover, and a handover to a wrong cell, and the handover report message further comprises one or more of the following: identification information of a candidate cell to which the terminal connects in the CHO, whether the terminal successfully connected to a candidate cell in the CHO, residence information of the terminal in a candidate cell after the terminal successful connects to the candidate cell in the CHO, and the RLF report.

11. The method according to claim 6, wherein when the second message indicates the terminal to perform the DAPS handover, and the third cell is a target cell in the DAPS handover, the method further comprises:

> adding the RLF report in the failure indication message if the RLF report transmitted by the terminal is received; and
>
> transmitting the failure indication message to the second cell through the third cell if the RLF report indicates that an RLF occurs in the second cell during the DAPS handover.

12. The method according to claim 11, further comprising:

> generating a handover report message according to the failure indication message, wherein the handover report message comprises identification information of the target cell in the DAPS handover.

13. A cell handover apparatus, applied to a network device, comprising a memory, a transceiver, and a processor:

> the memory is configured to store a computer program;
>
> the transceiver is configured to receive and transmit data under the control of the processor;
>
> the processor is configured to read the computer program in the memory and execute the method according to claim 6.

14. The apparatus according to claim 13, wherein the processor is further configured to perform the following operation:

> adding the RLF report in the failure indication message if the RLF report transmitted by the terminal is received.

15. The apparatus according to claim 13, wherein when the second message indicates the terminal to perform the CHO, the third cell belongs to one of multiple candidate cells in the CHO, and the processor is further configured to perform the following operation:

> if a connection failure is detected during the process of the terminal performing the handover from the second cell to a third cell according to the second message, and the terminal connects to a fourth cell after the connection failure, generating the failure indication message in the fourth cell, wherein the fourth cell is a further cell among the multiple candidate cells except for the third cell;

wherein the connection failure comprises a handover failure of the terminal performing the handover from the second cell to the third cell, or occurrence of an RLF in the third cell after the terminal successfully performs the handover from the second cell to the third cell.

16. The apparatus according to claim 13, wherein the failure indication message comprises one or more of the following: identification information of a candidate cell to which the terminal connects in the CHO, whether the terminal successfully connects to a candidate cell in the CHO, residence information of the terminal in a candidate cell after the terminal successfully connects to the candidate cell in the CHO, the RLF report, identification information of the terminal;

wherein the identification information of the terminal comprises: identification information of the terminal in a target cell to which the terminal successfully connects in the CHO, and/or identification information of the terminal in a source cell in the CHO.

17. A cell handover apparatus, applied to a terminal, comprising: a memory, a transceiver, and a processor;

the memory is configured to store a computer program;

the transceiver is configured to receive and transmit data under the control of the processor;

the processor is configured to read the computer program in the memory and perform the following operations:

receiving a first message transmitted by a first cell, wherein the first message indicates the terminal to perform a cell handover with an enhanced handover characteristic or a cell handover with a non-enhanced handover characteristic, and the cell handover with the enhanced handover characteristic comprises a conditional handover (CHO) or a dual active protocol stack (DAPS) handover;

performing a handover from the first cell to a second cell according to the first message;

receiving a second message transmitted by the second cell, wherein the second message indicates the terminal to perform the cell handover with the enhanced handover characteristic; and performing a handover from the second cell to a third cell according to the second message, and generating a radio link failure (RLF) report and recording timing duration in the RLF report if an RLF occurs in the second cell, wherein the timing duration is elapsed time from reception of the first message by the terminal to occurrence of the RLF in the second cell.

18. The apparatus according to claim 17, wherein the processor is further configured to perform the following operations:

restarting a reporting timer of the terminal when the terminal receives the first message;

storing a current value of the reporting timer as first duration and restarting the reporting timer again when the terminal receives the second message;

the generating the RLF report and recording the timing duration in the RLF report if the RLF occurs in the second cell comprises:

generating the RLF report if the RLF occurs in the second cell; and determining a current value of the reporting timer as second duration, and recording the first duration and the second duration in the RLF report.

19. The apparatus according to claim 17, wherein when the first message indicates the terminal to perform the cell handover with the non-enhanced handover characteristic, the processor is further configured to perform the following operations:

restarting a reporting timer of the terminal when the terminal receives the first message;

the generating the RLF report and recording the timing duration in the RLF report if the RLF occurs in the second cell comprises:

generating the RLF report and recording a current value of the reporting timer as the timing duration in the RLF report if the RLF occurs in the second cell.

20. The apparatus according to claim 19, wherein the processor is further configured to perform the following operation:

restarting the reporting timer again after the terminal completes the handover from the second cell to the third cell according to the second message.

* * * * *